United States Patent
Terashima

(10) Patent No.: US 7,978,248 B2
(45) Date of Patent: Jul. 12, 2011

(54) DATA PROCESSING APPARATUS AND DATA PROCESSING METHOD FOR DISPLAYING IMAGE CAPTURE MODE CANDIDATES

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 12/209,632

(22) Filed: Sep. 12, 2008

(65) Prior Publication Data

US 2009/0073285 A1 Mar. 19, 2009

(30) Foreign Application Priority Data

Sep. 14, 2007 (JP) ................................ 2007-239096

(51) Int. Cl.
*H04N 5/222* (2006.01)
(52) U.S. Cl. .......... 348/333.05; 348/333.02; 348/333.11
(58) Field of Classification Search ............. 348/333.01, 348/333.02, 333.05, 333.11
See application file for complete search history.

(56) References Cited

U.S. PATENT DOCUMENTS

| 2001/0031072 | A1 | 10/2001 | Dobashi et al. | |
|---|---|---|---|---|
| 2006/0192879 | A1* | 8/2006 | Hisamatsu | 348/333.01 |
| 2006/0215034 | A1 | 9/2006 | Nakabayashi et al. | |
| 2007/0058064 | A1* | 3/2007 | Hara et al. | 348/333.01 |
| 2007/0065137 | A1* | 3/2007 | Hara et al. | 396/291 |
| 2007/0181687 | A1* | 8/2007 | Fukushima et al. | 235/454 |

FOREIGN PATENT DOCUMENTS

| CN | 1768535 A | 5/2006 |
|---|---|---|
| JP | 2002-10133 | 1/2002 |
| JP | 2003-319327 | 11/2003 |
| JP | 2003-344891 | 12/2003 |

* cited by examiner

*Primary Examiner* — Jason Whipkey
(74) *Attorney, Agent, or Firm* — Oblon, Spivak, McClelland, Maier & Neustadt, L.L.P.

(57) ABSTRACT

A data processing apparatus includes: an image capture mode storing section that stores image capture modes each associated with a feature value related to a subject as a selection condition for selecting an image capture mode candidate according to the subject; a feature value extracting section that extracts a feature value included in captured data that is captured by converting incident light from the subject; an image capture mode candidate selecting section that selects image capture mode candidates from among the image capture modes stored in the image capture mode storing section, on the basis of the feature value extracted from the feature value extracting section; and a display control section that displays on a display section the image capture mode candidates selected by the image capture mode candidate selecting section.

14 Claims, 15 Drawing Sheets

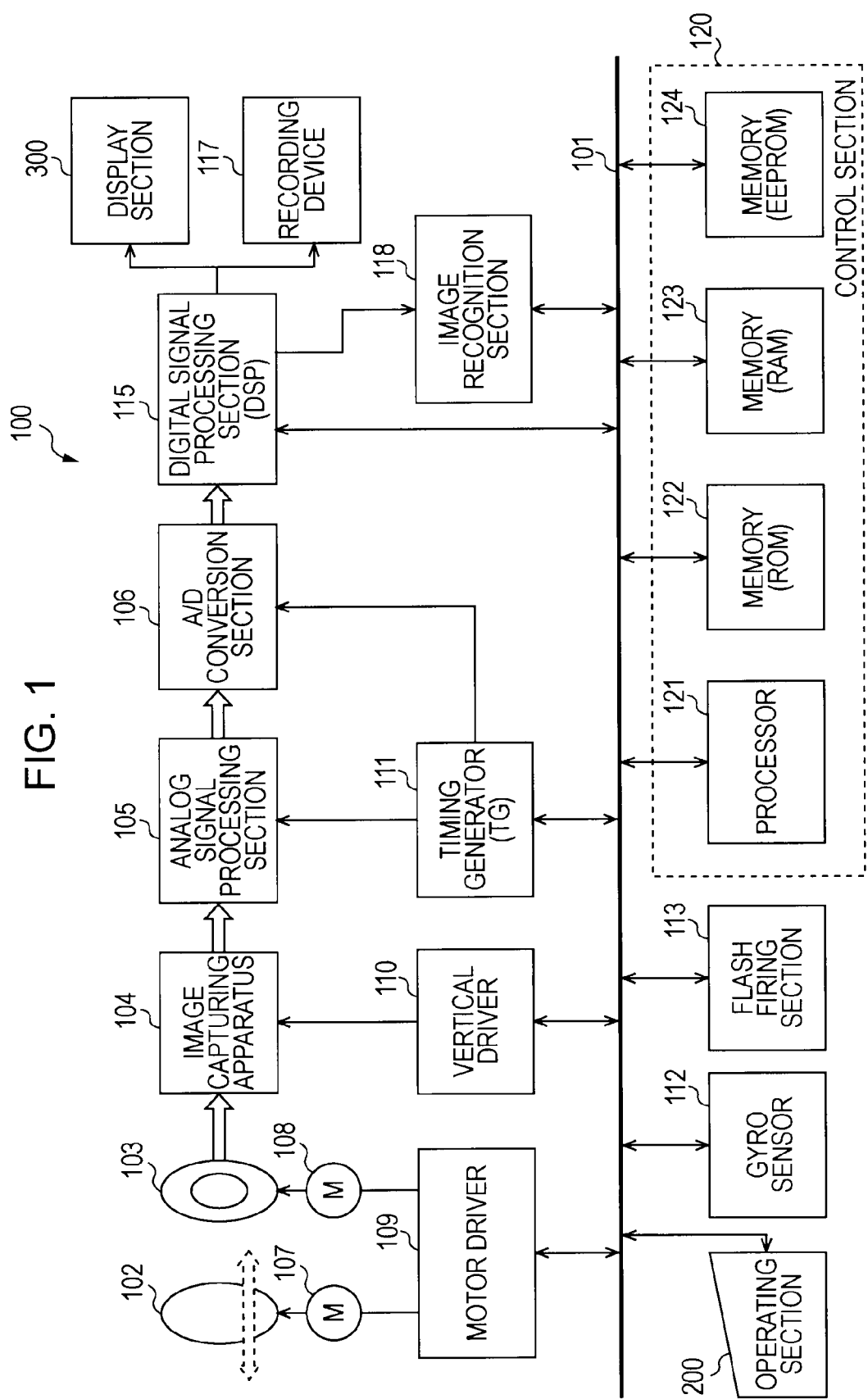

FIG. 4

| IMAGE CAPTURE MODE | BRIGHTNESS HISTOGRAM | HUE INFORMATION | FACE | FACE SIZE | FACE POSITION | MOTION |
|---|---|---|---|---|---|---|
| LANDSCAPE MODE | ... | ... | ... | ... | ... | ... |
| HIGH-SPEED SHUTTER MODE | ... | ... | MAIN | ... | ... | LARGE |
| NIGHT VIEW MODE | ... | ... | ... | ... | ... | ... |
| NIGHT VIEW AND PORTRAIT MODE | ... | ... | MAIN | ... | ... | ... |
| FIREWORKS MODE | ... | ... | ... | ... | ... | ... |
| HIGH SENSITIVITY MODE | ... | ... | ... | ... | ... | ... |
| SNOW MODE | ... | ... | MAIN | ... | ... | ... |
| BEACH MODE | ... | ... | MAIN | ... | ... | ... |
| SUBJECT TRACKING MODE | ... | ... | MAIN | ... | ... | LARGE |
| UNDERWATER MODE | ... | ... | MAIN | ... | ... | ... |
| PORTRAIT MODE | ... | ... | MAIN | WITHIN SPECIFIED RANGE | WITHIN SPECIFIED RANGE | NONE |

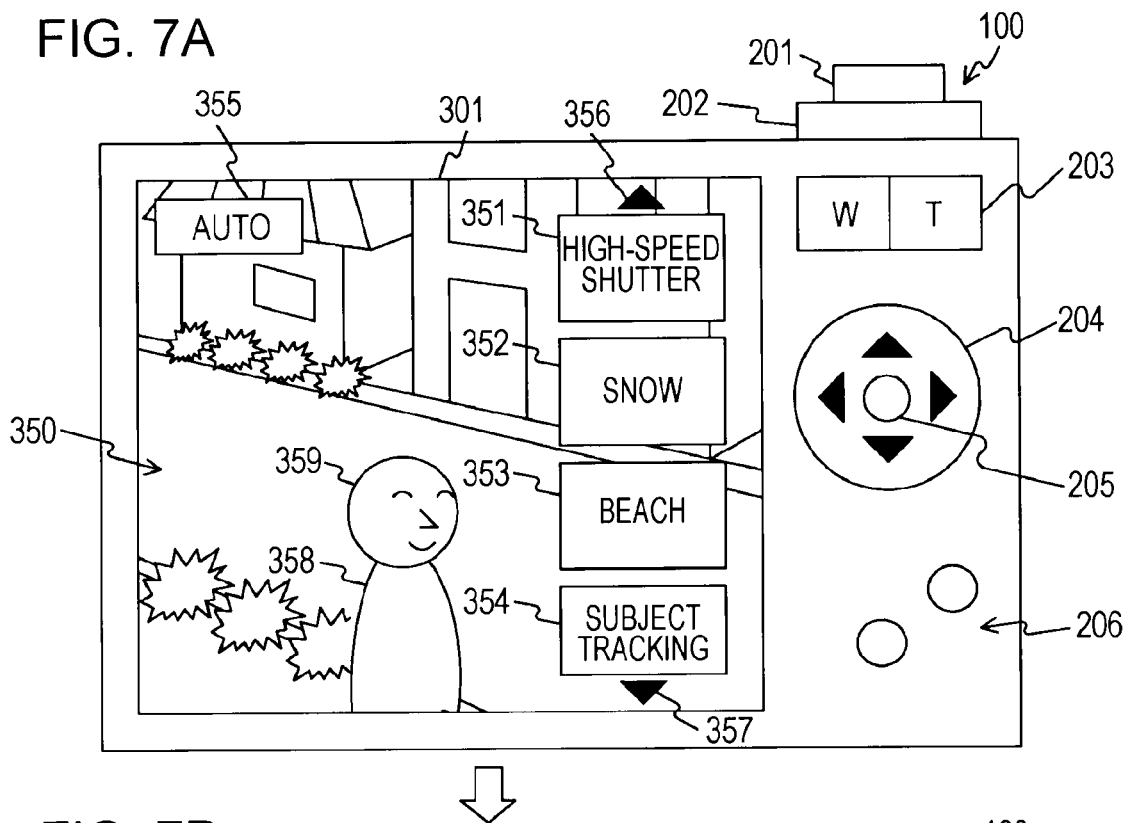
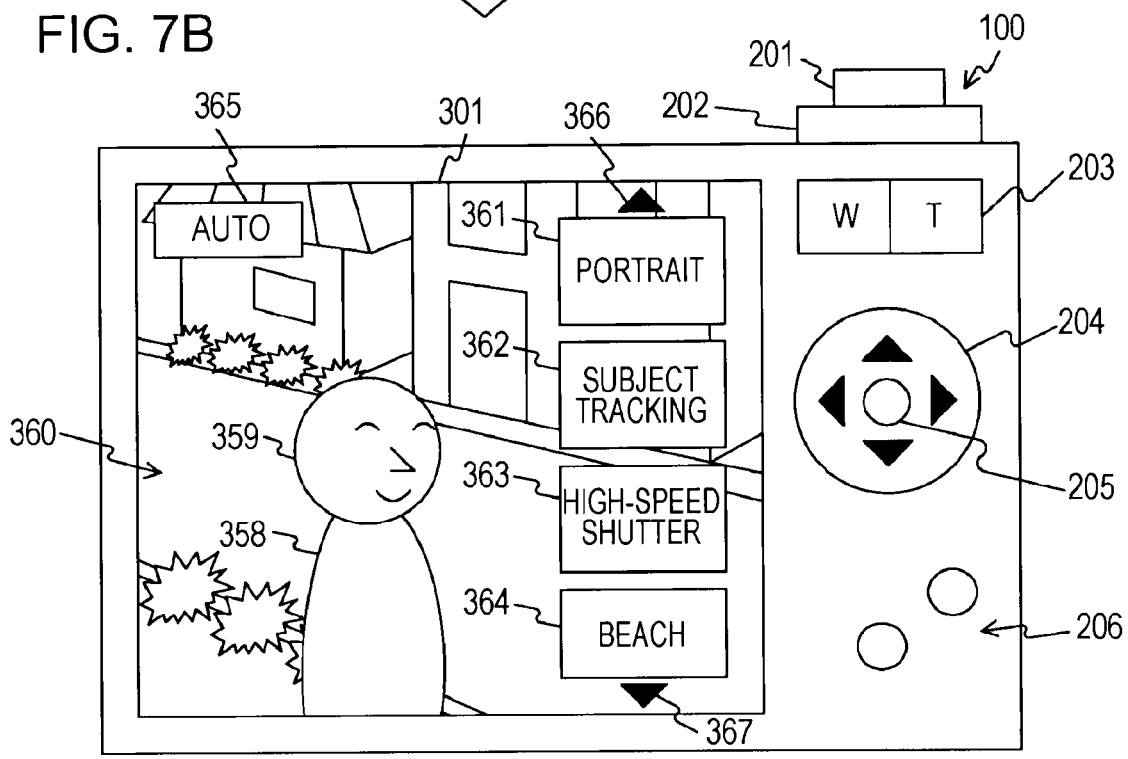

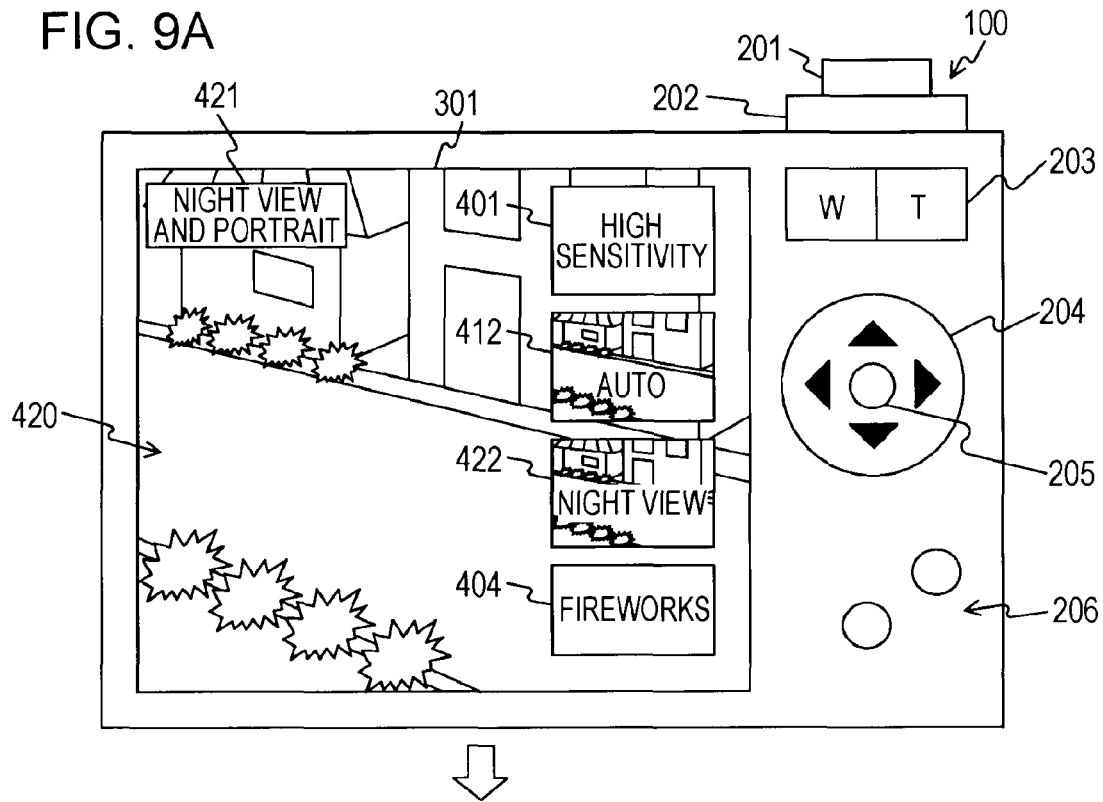

DATA PROCESSING APPARATUS AND DATA PROCESSING METHOD FOR DISPLAYING IMAGE CAPTURE MODE CANDIDATES

CROSS REFERENCES TO RELATED APPLICATIONS

The present invention contains subject matter related to Japanese Patent Application JP 2007-239096 filed in the Japanese Patent Office on Sep. 14, 2007, the entire contents of which are incorporated herein by reference.

BACKGROUND OF THE INVENTION

1. Field of the Invention

The present invention relates to a data processing apparatus, in particular, a data processing apparatus and a data processing method which make it possible to set a plurality of image capture modes.

2. Description of the Related Art

Recent years have seen widespread use of a type of image capturing apparatus as a data processing apparatus which captures an image of a subject such as a person and records the image as image data, such as a digital still camera. In such an image capturing apparatus, various image capture conditions such as the shutter speed, aperture, strobe firing, macro settings, and ISO sensitivity are set by the user, thereby making it possible to record a beautiful captured image that is adapted to a subject. However, the setting of these image capture conditions is often difficult for general users.

Accordingly, there has been proposed an image capturing apparatus in which image capture conditions that are used relatively frequently are registered as image capture modes in advance, and the user makes a selection from these registered image capture modes, thereby making it possible to set image capture conditions adapted to a subject. According to this image capturing apparatus, when the user selects an image capture mode that matches the image of a subject that the user is about to shoot, image capture conditions corresponding to this selected image capture mode are set. Thus, a captured image adapted to user preferences can be easily recorded.

Also, there has been proposed an image capturing apparatus that makes it possible to select a large number of finely adjustable image capture modes corresponding to individual image capture scenes in order to allow setting of appropriate image capture conditions adapted to user preferences. If a large number of image capture modes can be selected as described above, this allows settings adapted to user preferences. However, the operation of selecting a desired image capture mode from the large number of image capture modes may become cumbersome. Further, relatively inexperienced users may find it difficult to select a desired image capture mode from the large number of image capture modes.

Accordingly, there has been proposed an apparatus which sets an image capture mode by using a face detection technique as a typical example of image recognition technique. For example, there has been proposed a camera which recognizes whether or not a face is included in a subject, and also detects the state of the subject to set an image capture mode on the basis of these pieces of information (for example, see Japanese Unexamined Patent Application Publication No. 2003-344891 (FIG. 1)). According to this related art, the image capture mode is automatically set, so the user does not have to worry about which image capture mode to set. However, in a case where, for example, a face included in a subject is turned to the side, the face may not be detected properly. Thus, an image capture mode (for example, Portrait mode) desired by the user may not be set properly.

As described above, the image recognition process is not always perfect. Depending on the conditions such as the brightness, focusing, size, and motion of a subject, correct image recognition may be hindered. Therefore, it is necessary to facilitate the selection of an appropriate image capture mode adapted to user preferences. Accordingly, there have been proposed a large number of apparatuses which facilitate the selection of an appropriate image capture mode adapted to user preferences.

For example, there has been proposed a camera apparatus in which sample images corresponding to image capture modes are displayed, and an image capture mode is set by making a selection from these sample images (see, for example, Japanese Unexamined Patent Application Publication No. 2002-10133 (FIG. 1)). Further, for example, there has been proposed a digital camera in which thumbnail images stored in the server are acquired via the network, and desired image capture conditions are set while looking at these thumbnail images (see, for example, Japanese Unexamined Patent Application Publication No. 2003-319327 (FIG. 1)).

SUMMARY OF THE INVENTION

According to the related art described above, the user can set an image capture mode while looking at sample images or thumbnail images prepared in advance. However, if sample images or thumbnail images do not reflect user preferences, it may be difficult for the user to make an appropriate selection. Further, depending on the subject, a plurality of sets of appropriate image capture conditions may exist. In this case, since users have diverse preferences, it is difficult to easily set appropriate image capture conditions adapted to user preferences.

It is thus desirable to make it possible to easily set appropriate image capture conditions adapted to user preferences.

An embodiment of the present invention relates to a data processing apparatus and a data processing method for the data processing apparatus. The data processing apparatus includes: image capture mode storing means for storing image capture modes each associated with a feature value related to a subject as a selection condition for selecting an image capture mode candidate according to the subject; feature value extracting means for extracting a feature value included in captured data that is captured by converting incident light from the subject; image capture mode candidate selecting means for selecting image capture mode candidates from among the image capture modes stored in the image capture mode storing means, on the basis of the feature value extracted from the feature value extracting means; and display control means for displaying on display means the image capture mode candidates selected by the image capture mode candidate selecting means. Accordingly, a feature value included in capture data is extracted, image capture mode candidates are selected from among a plurality of image capture modes stored in the image capture mode storing means on the basis of this extracted feature value, and the selected image capture mode candidates are displayed.

In the above-mentioned embodiment, the display means may display indicators on the display means, the indicators indicating the image capture mode candidates selected by the image capture mode candidate selecting means and each including at least one of a letter, a symbol, a numeral, and a figure related to each of the selected image capture mode candidates. Accordingly, indicators each including at least one of a letter, a symbol, a numeral, and a figure related to each selected image capture mode candidate are displayed as indicators indicating image capture mode candidates.

In the above-mentioned embodiment, the data processing apparatus may further include operation accepting means for accepting a selecting operation for selecting a desired image capture mode from among the image capture mode candidates displayed on the display means, and image capture mode setting means for setting the image capture mode selected by the selecting operation. Accordingly, when a selecting operation for selecting a desired image capture mode from among displayed image capture mode candidates is accepted, the selected image capture mode is set.

In the above-mentioned embodiment, the data processing apparatus may further include reduced image generating means for generating a reduced image by reducing, when the selecting operation for selecting a desired image capture mode is accepted by the operation accepting means, a captured image corresponding to the captured data at the time when the selecting operation is accepted, and the display control means may display the reduced image in an area where an image capture mode candidate for which the selecting operation has been made is previously displayed, together with an indicator indicating an image capture mode that is set at the time when the selecting operation is accepted. Accordingly, when a selecting operation for selecting a desired image capture mode is accepted, a captured image is reduced at the time when the selecting operation is accepted to thereby generate a reduced image, and the reduced image and an indicator indicating the image capture mode set at the time when this selecting operation is accepted are displayed in the area where the image capture mode candidate for which the selecting operation has been made is previously displayed.

In the above-mentioned embodiment, the operation accepting means may accept a selecting operation for selecting a desired image capture mode from among the image capture mode candidates displayed on the display means or the indicators. Accordingly, a selecting operation for selecting a desired image capture mode from among displayed image capture mode candidates or indicators is accepted.

In the above-mentioned embodiment, the data processing apparatus may further include subject change determining means for determining a certain change that has occurred in a subject included in the captured image, on the basis of the feature value extracted from the feature value extracting means, and the display control means may erase the displayed reduced image if it is determined that a certain change has occurred in a subject included in the captured image. Accordingly, a certain change that has occurred in a subject included in a captured image is determined on the basis of an extracted feature value, and if it is determined that the certain change has occurred in the subject, a displayed reduced image is erased.

In the above-mentioned embodiment, if it is determined that a certain change has occurred in a subject included in the captured image, the display control means may display a message stating that the displayed reduced image is to be erased, before erasing the displayed reduced image. Accordingly, if it is determined that a certain change has occurred in a subject, the reduced image is erased after displaying a message stating that the displayed reduced image is to be erased.

In the above-mentioned embodiment, the image capture mode candidate selecting means may select image capture mode candidates from among the image capture modes stored in the image capture mode storing means, by determining whether or not the subject definitely corresponds to a specific image capture mode of the image capture modes stored in the image capture mode storing means and whether or not the subject does not definitely correspond to the specific image capture mode, on the basis of the extracted feature value. Accordingly, image capture mode candidates are selected by determining whether or not a subject definitely corresponds to a specific image capture mode, and whether or not the subject does not definitely corresponds to the specific image capture mode on the basis of an extracted feature value.

In the above-mentioned embodiment, the image capture mode storing means may store image capture modes each associated with information related to a predetermined target object as the selection condition, the data processing apparatus may further include target object detecting means for detecting the predetermined target object included in the captured data, and the image capture mode candidate selecting means may select image capture mode candidates from among the image capture modes stored in the image capture mode storing means, on the basis of the feature value extracted from the feature value extracting means and the target object detected by the target object detecting means. Accordingly, a predetermined target object included in captured data is detected, and image capture mode candidates are selected on the basis of an extracted feature value and the detected predetermined object.

In the above-mentioned embodiment, the target object detecting means may detect a face of a person as the predetermined target object included in the captured data, and the image capture mode candidate selecting means may select image capture mode candidates from among the image capture modes stored in the image capture mode storing means, on the basis of a relative relationship between a captured image corresponding to the captured data and the detected face. Accordingly, a face included in captured data is detected, and image capture mode candidates are selected on the basis of a relative relationship between a captured image and the detected face.

Further, an embodiment of the present invention relates to a data processing apparatus and a data processing method for the data processing apparatus. The data processing apparatus includes: image capture mode storing means for storing image capture modes each associated with a feature value related to a subject as a selection condition for selecting an image capture mode candidate according to the subject; target object detecting means for detecting a target object included in captured data that is captured by converting incident light from the subject; image capture mode candidate selecting means for selecting image capture mode candidates from among the image capture modes stored in the image capture mode storing means, on the basis of the target object extracted from the target object extracting means; and display control means for displaying on display means the image capture mode candidates selected by the image capture mode candidate selecting means. Accordingly, a predetermined target object included in captured data is detected, image capture mode candidates are selected from among a plurality of image capture mode candidates stored in the image capture mode storing means, and the selected image capture mode candidates are displayed.

The present invention advantageously makes it possible to easy set image capture conditions adapted to user preferences.

BRIEF DESCRIPTION OF THE DRAWINGS

FIG. 1 is a block diagram showing an example of the functional configuration of an image capturing apparatus;

FIG. 4 is a diagram showing an example of selection conditions associated with image capture modes stored in an image capture mode storing section;

FIGS. 7A and 7B are views each showing an example of display of a captured image and image capture mode setting buttons;

FIGS. 9A and 9B are views each showing an example of display of a captured image and image capture mode setting buttons;

DESCRIPTION OF THE PREFERRED EMBODIMENTS

Figure 2A:
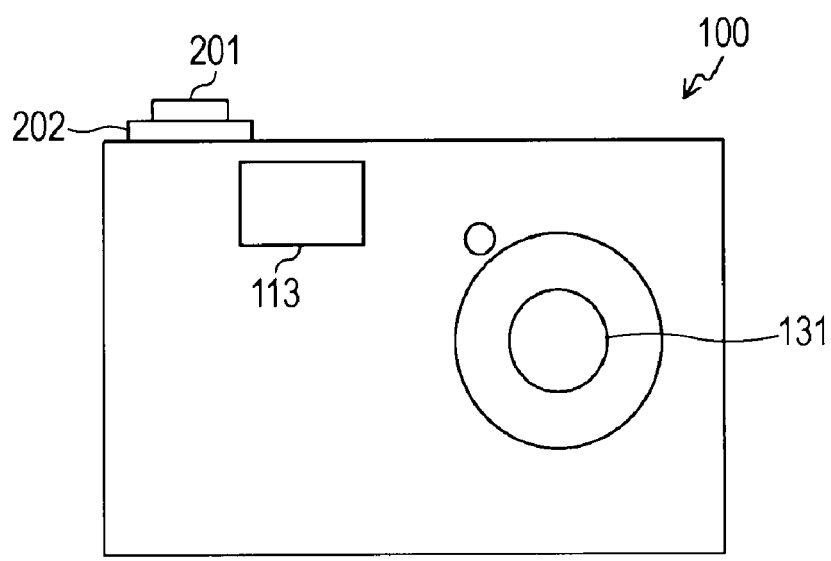
FIGS. 2A to 2C are views each showing the outward appearance of an image capturing apparatus.

Now, an embodiment of the present invention will be described in detail with reference to the drawings.

FIG. 1 is a block diagram showing an example of the functional configuration of an image capturing apparatus 100 as a data processing apparatus according to an embodiment of the present invention. The image capturing apparatus 100 includes a system bus 101, a lens 102, an aperture mechanism 103, an image sensor 104, an analog signal processing section 105, an A/D conversion section 106, a lens driving motor 107, an aperture driving motor 108, a motor driver 109, a vertical driver 110, a timing generator (hereinafter, referred to as "TG") 111, a gyro sensor 112, a flash firing section 113, a digital signal processing section (hereinafter, referred to as "DSP") 115, a recording device 117, an image recognition section 118, a control section 120, an operating section 200, and a display section 300. The image capturing apparatus 100 can be realized by, for example, a digital still camera that can set a plurality of image capture modes.

In the image capturing apparatus 100, the control section 120 is connected to the system bus 101, and also the motor driver 109, the vertical driver 110, the TG 111, the gyro sensor 112, the flash firing section 113, the operating section 200, the DSP 115, and the image recognition section 118 are connected to the system bus 101.

The lens 102 takes in incident light from a subject, and supplies the incident light to the aperture mechanism 103. The lens 102 is driven by the lens driving motor 107 so as to move back and forth relative to the subject, thus effecting focusing or zooming. The aperture mechanism 103 adjusts the amount of incident light that has passed through the lens 102, and supplies the resulting incident light to the image sensor 104. The aperture mechanism 103 is driven by the aperture driving motor 108 and adjusted in the opening of an aperture.

The image sensor 104 is a photoelectric conversion element that receives the incident light supplied from the aperture mechanism 103, and converts the incident light into an electrical signal. The image sensor 104 is driven by the vertical driver 110. It should be noted that the image sensor 104 has on the front side of each pixel a color filter that passes one of red (R) light, green (G) light, and blue (B) light, for example, and receives a pixel signal of each color. CCDs (Charge Coupled Devices) or the like are used for the image sensor. The converted electrical signal is supplied to the analog signal processing section 105. The analog signal processing section 105 is driven by the TG 111, and applies an analog process such as noise removal to the electrical signal from the image sensor 104. The signal that has been processed by the analog signal processing section 105 is supplied to the A/D conversion section 106. The A/D conversion section 106 is driven by the TG 111, and converts the signal from the analog signal processing section 105 into a digital signal. The signal thus converted by the A/D conversion section 106 is supplied to the DSP 115.

The lens driving motor 107 drives the lens 102 in accordance with an instruction from the motor driver 109. The aperture driving motor 108 drives the aperture mechanism 103 in accordance with an instruction from the motor driver 109. The motor driver 109 drives the lens driving motor 107 and the aperture driving motor 108 in accordance with an instruction from the control section 120. The vertical driver 110 drives the image sensor 104 in accordance with an instruction from the control section 120. The TG 111 generates a drive control signal for each of the analog signal processing section 105 and the A/D conversion section 106 on the basis of a reference clock transmitted from the control section 120.

The gyro sensor 112 detects a change of the image sensor 104 corresponding to a positional change in the horizontal or vertical direction of a captured image at image capture (so-called camera shake or the like), and transmits the amount of the detected change to the control section 120. The flash firing section 113 radiates a light beam to a subject so as to increase the amount of light (reflected light) from the subject, in accordance with an instruction from the control section 120. This enables image capture even under low ambient lighting conditions.

The operating section 200 is a switch, buttons, and the like for transmitting information on various user's operations (various shutter and camera settings, image selection, and the like) to the control section 120. The operating section 200 may be also implemented as a touch panel. It should be noted that the switch, buttons, and the like constituting the operating section 200 will be described later in detail with reference to FIG. 2 and FIGS. 15A to 15C.

The DSP 115 performs image processing such as black level correction, white balance adjustment, γ correction, and the like with respect to the digital signal from the A/D conversion section 106, in accordance with an instruction from the control section 120. As the output of the DSP 115, image data is transmitted to the display section 300, the recording device 117, the image recognition section 118, and the like.

The display section 300 is an apparatus that displays image data transmitted from the DSP 115. Prior to image capture, the display section 300 displays image data that has undergone image processing by the DSP 115 as a preview screen, and after image capture, the display section 300 displays an image recorded on the recording device 117.

The recording device 117 saves image data that has undergone image processing by the DSP 115.

The image recognition section 118 extracts feature values from the image data that has undergone image processing by the DSP 115, in accordance with an instruction from the control section 120. On the basis of the feature values, the image recognition section 118 determines whether or not a subject in this image data corresponds to a specific image capture scene, and outputs the determination result to the control section 120. Further, in accordance with an instruction from the control section 120, the image recognition section 118 detects a face included in the image data that has undergone image processing by the DSP 115, and outputs the detection result to the control section 120. That is, the image recognition section 118 identifies or detects a subject included in a captured image itself, the condition of the subject, and its ambient condition.

For example, there are various methods of determining a shooting scene or a subject. For example, as a method of determining a back-light scene or a night view scene, there is a method of creating a histogram of the brightness of the entire screen of a captured image, and executing pattern matching of the distribution of the created histogram to thereby determine a back-light scene or a night view scene. Further, by using hue information and light source estimation information together with the determination based on the histogram of the brightness of the entire screen of a captured image, more scenes can be determined. For example, if it is determined that a subject in a captured image is outdoors, on the basis of a hue that exists in the captured image and the position of the hue, it is possible to identify scenes such as sea, snowy mountains, and underwater.

Further, a face detection method which detects a person's face included in a subject by using a face detection technique is widely known. As such a face detection method, for example, there is a face detection method which detects a face on the basis of matching between a template in which face brightness distribution information is recorded, and the actual image (see, for example, Japanese Unexamined Patent Application Publication No. 2004-133637). By using these face detection methods, whether or not a person's face is included in a subject can be determined. Also, the size and position of the face included in the subject can be detected.

In addition to these detections, the moving condition of a subject can be estimated from motion vector information of a captured image. Further, by using focal length information and auto-focus position information, the distance of a subject from the image capturing apparatus 100 can be grasped. Thus, the accuracy of scene determination can be further enhanced. That is, in a case where a subject in a captured image is determined as corresponding to a night view, if a moving subject is included in the subject, there is a possibility that the main subject is not the night view but is the moving subject. Thus, there are times when the validity of determining that a subject is a night view scene cannot be guaranteed. Further, in a case where the focus position is distant, the likelihood of being a night view can be enhanced in comparison to determining a night view solely on the basis of a brightness histogram.

Since each shooting scene can be determined by the scene determination method described above, an optimal image capture mode for a subject in the current captured image can be narrowed down from a plurality of image capture modes stored in an image capture mode storing section 250.

The control section 120 includes a processor (CPU or the like) 121, a memory (ROM) 122, a memory (RAM) 123, and a memory (EEPROM) 124. The ROM 122 stores programs for performing various kinds of software processing in the processor 121, and the RAM 123 is a working memory. The EEPROM 124 is a memory in which data is held even while the power of the image capturing apparatus 100 is off, and records various setting conditions and the like. Further, the memory (ROM) 122 stores individual pieces of information related to the selection conditions for a plurality of image capture modes. It should be noted that the image capture modes stored in the memory (ROM) 122 will be described later in detail with reference to FIG. 4. Further, captured images to be displayed on the display section 200 are saved in the memory (RAM) 123.

The processor 121 serves as the central portion for performing operation control of the entire image capturing apparatus 100 or the like. The processor 121 organically controls the drives of respective components of the image capturing apparatus 100 for collective operation control. At image capture, on the basis of a user's operation input from the operating section 200, camera shake information from the gyro sensor 112, image information from the DSP 115, and a determination result from the image recognition section 118, the processor 121 transmits control signals to the motor driver 109, the flash firing section 113, the vertical driver 110, the TG 111, and the like to drive the lens 102, the aperture mechanism 103, and the like, thereby automatically controlling exposure, white balance, focus, and flash.

When playing back a recoded image, the processor 121 transmits a control signal to the DSP 115 in accordance with a user's operation input from the operating section 200, thus displaying an image recorded on the recording device 117 on the display section 300.

Further, on the basis of the result of determination by the image recognition section 118, the processor 121 selects image capture modes suitable for a subject in the current captured image as image capture mode candidates, from among a plurality of image capture modes stored in the memory (ROM) 122, and causes indicators indicating the image capture mode candidates to be displayed on the display section 300 together with a captured image. If one of the indicators indicating the image capture mode candidates is selected by the user, the captured image at the time of this selection is reduced, and the reduced image is displayed at the position of this selected indicator. Further, an image capture mode corresponding to this selected indicator is set.

Figure 2B:
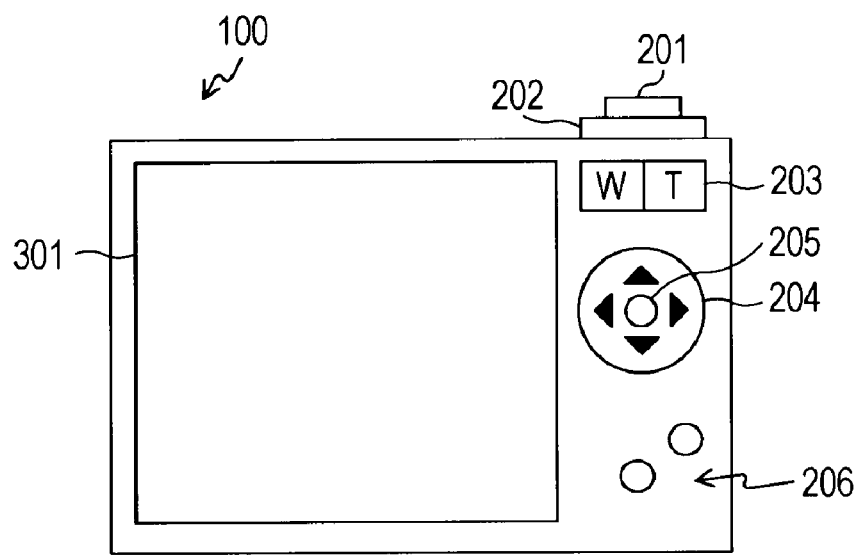
Figure 2C:
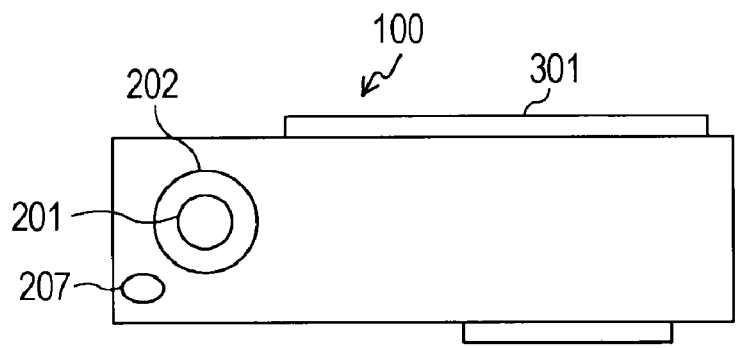

FIGS. 2A to 2C are views each showing the outward appearance of the image capturing apparatus 100 according to an embodiment of the present invention. FIG. 2A is a front view showing the outward appearance of the image capturing apparatus 100, FIG. 2B is a rear view showing the outward appearance of the image capturing apparatus 100, and FIG. 2C is a plan view showing the outward appearance of the image capturing apparatus 100.

The image capturing apparatus 100 includes the flash firing section 113, an outside lens 131, a release switch 201, a mode dial 202, a zoom button 203, an up/down/left/right operating button 204, an Enter button 205, an operating button 206, a power switch 207, and a liquid crystal display section 301. The flash firing section 113 is the same as that shown in FIG. 1 and is thus denoted by the same reference numeral, and detailed description thereof is omitted here. The release switch 201, the mode dial 202, the zoom button 203, the up/down/left/right operating button 204, the Enter button 205, the operating button 206, and the power switch 207 correspond to the operating section 200 shown in FIG. 1. Further, the liquid crystal display section 301 corresponds to the display section 300 shown in FIG. 1.

The outside lens 131 is a lens that is exposed to the outside, out of lenses for taking in incident light from a subject. This incident light is supplied to the image sensor 104 via other lenses and the aperture mechanism 103.

The release switch 201 is a release switch for starting capture of a still or moving image. A full-press or half-press operation on the release switch 201 made by the user is outputted to the control section 120. When the release switch 201 is pressed halfway or fully, optimal auto-focus control and auto control for shooting are carried out by the control section 120. When the release switch 201 is fully switched, these auto-focus control and auto control are carried out, and image data captured at the time of this full-press operation is recorded onto the recording device 117.

The mode dial 202 is a dial used when the user manually sets various image capture modes.

A zoom button 203 is a button for accepting a zoom operation made by the user, and information of the accepted zoom operation is outputted to the control section 120. Specifically, the zoom button 203 includes a W (Wide) button and a T (Telephoto) button shown in FIG. 2B. While the W button is depressed, a zoom lens (not shown) moves to the wide end side (wide-angle side), and while the T button is depressed, the zoom lens moves to a telephoto end side (telephoto side).

The up/down/left/right operating button 204 is an operating button used for selecting each setting item or the like displayed on the liquid crystal display section 301. Depending on the depressed button, the item being currently selected moves up, down, to the left, or to the right. When setting an image capture mode by using image capture mode setting buttons (401 to 404 and the like) shown in FIGS. 7A to 10B, a desired image capture mode setting button can be selected by depressing the up/down button of the up/down/left/right operating button 204. In this case, the display of the image capture mode setting button being currently selected becomes different from the display of other image capture mode setting buttons. An image capture mode setting button is an indicator used when setting an image capture mode. The image capture mode setting button will be described later in detail with reference to FIGS. 7A to 10B.

The Enter button 205 is a button used for verifying each setting item or the like displayed on the liquid crystal display section 301. When setting an image capture mode by using the image capture mode setting buttons shown in FIGS. 7A to 10B, a desired image capture mode can be set by depressing the Enter button 205 in a state where a desired image capture mode setting button is being selected.

The operating button 206 is an operating button used when making various operations.

The liquid crystal display section 301 is a display section on which a captured image or the like outputted from the DSP 115 is displayed. The liquid crystal display section 301 may be implemented as a touch panel as well.

The power switch 207 is a switch used to turn ON/OFF the power supply of the image capturing apparatus 100.

When the user performs shooting by using the image capturing apparatus 100, captures data obtained by conversion of incident light taken in through the outside lens 131 is displayed on the liquid crystal display section 301. The user can thus easily perform an operation (framing) of cutting a desired screen as a frame out of a space that stretches out in front of the image capturing apparatus 100, or get an idea of the shot.

Figure 3:
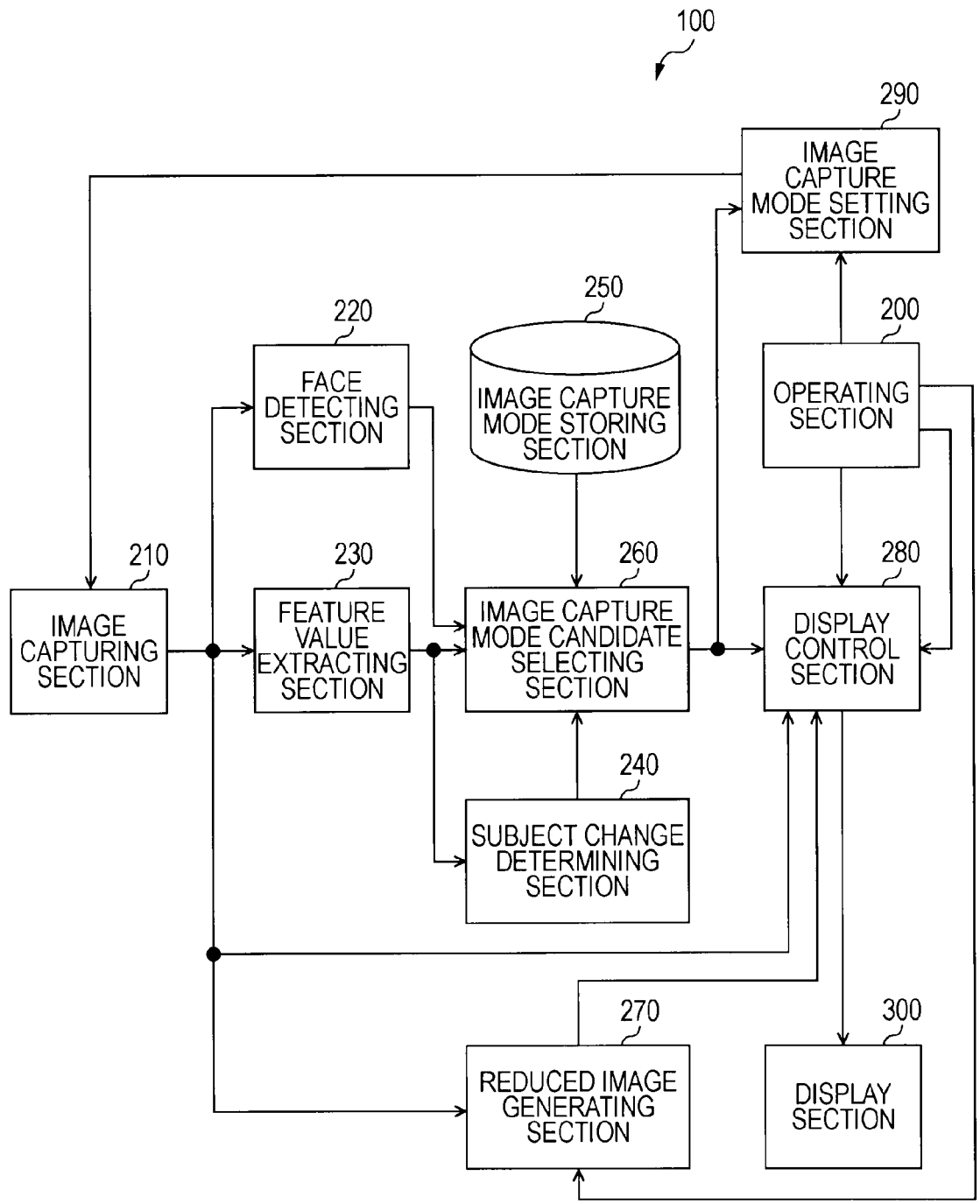
FIG. 3 is a block diagram showing an example of the functional configuration of an image capturing apparatus.

FIG. 3 is a block diagram showing an example of the functional configuration of the image capturing apparatus 100 according to an embodiment of the present invention. The image capturing apparatus 100 includes the operating section 200, an image capturing section 210, a face detecting section 220, a feature value extracting section 230, a subject change determining section 240, an image capture mode storing section 250, an image capture mode candidate selecting section 260, a reduced image generating section 270, a display control section 280, an image capture mode setting section 290, and the display section 300.

The operating section 200 corresponds to the operating section 200 shown in FIG. 1, and outputs information of an accepted operation input to the reduced image generating section 270, the display control section 280, and the image capture mode setting section 290.

The image capturing section 210 converts incident light from a subject into captured data, and outputs the converted captured data to the face detecting section 220, the feature value extracting section 230, the reduced image generating section 270, and the display control section 280. Further, the image capturing section 210 converts incident light from a subject into captured data in accordance with the image capture mode set by the image capture mode setting section 290.

The face detecting section 220 detects a person's face included in a captured image corresponding to the captured data outputted from the image capturing section 210. When a person's face is detected, the face detecting section 220 outputs face detection information including the size and position of the detected face to the image capture mode candidate selecting section 260.

The feature value extracting section 230 extracts various feature values from the captured data outputted from the image capturing section 210, and outputs the extracted feature values to the subject change determining section 240 and the image capture mode candidate selecting section 260.

The subject change determining section 240 determines whether or not a certain change has occurred in a subject in a captured image, on the basis of the feature values outputted from the feature value extracting section 230, and outputs the determination result to the image capture mode candidate selecting section 260.

The image capture mode storing section 250 stores selection conditions for image capture mode selection conditions related to image capture performed by the image capturing section 210, and supplies the stored image capture mode selection conditions to the image capture mode candidate selecting section 260. The image capture mode selection conditions will be described later in detail with reference to FIG. 4.

The image capture mode candidate selecting section 260 selects one or a plurality of image capture mode candidates suitable for a subject in the current captured image from among a plurality of image capture modes stored in the image capture mode storing section 250, on the basis of face detection information outputted from the face detecting section 220 and feature values outputted from the feature value extracting section 230. The image capture mode candidate selecting section 260 outputs the selected image capture mode candidates to the display control section 280 and the image capture mode setting section 290. Further, on the basis of the face detection information outputted from the face detecting section 220 and the feature values outputted from the feature value extracting section 230, the image capture mode candidate selecting section 260 determines a display order in which the selected image capture mode candidates are displayed on the display section 300. The determined display order is outputted to the display control section 280 and the image capture mode setting section 290 together with the selected image capture mode candidates. It should be noted that the selection of image capture mode candidates and the determination of their display order will be described later in detail with reference to FIG. 5 and FIGS. 6A and 6B.

When the operating section 200 accepts a selecting operation for selecting an image capture mode candidate from among the one or plurality of image capture mode candidates displayed on the display section 300, the reduced image generating section 270 reduces a captured image corresponding to captured data outputted from the image capturing section 210 at the time when the selecting operation is accepted, and outputs the reduced captured image to the display control section 280.

In accordance with an operation input from the operating section 200, the display control section 280 displays on the display section 300 a captured image corresponding to captured data outputted from the image capturing section 210, and displays image capture mode setting buttons, which are indicators indicating image capture mode candidates outputted from the image capture mode candidate selecting section 260, on the display section 300 so as to be superimposed on the captured image. Further, when a selecting operation for selecting an image capture mode candidate from among the one or plurality of image capture mode candidates displayed on the display section 300 is accepted by the operating section 200, the display control section 280 displays letters indicating the image capture mode and a reduced image outputted from the reduced image generating section 270, in the display area of the image capture mode setting button on which this selecting operation has been made. An example of display of such a captured image and image capture mode setting buttons will be described later in detail with reference to FIGS. 7A to 10B.

When a selecting operation for selecting an image capture mode candidate from among the one or plurality of image capture mode candidates displayed on the display section 300 is accepted by the operating section 200, the image capture mode setting section 290 selects the image capture mode for which the selecting operation has been made, from among image capture mode candidates outputted from the image capture mode candidate selecting section 260, and sets the selected image capture mode as the new image capture mode.

The display section 300 corresponds to the display section 300 shown in FIG. 1, and displays a captured image and image capture mode setting buttons on the basis of control of the display control section 280. An example of display of such a captured image and image capture mode setting buttons will be described later in detail with reference to FIGS. 7A to 10B.

FIG. 4 is a diagram showing an example of selection conditions associated with image capture modes stored in the image capture mode storing section 250 shown in FIG. 3.

In the image capture mode storing section 250, a plurality of image capture modes 251 are stored while being associated with various feature values and face-related information which are used for the selection of image capture mode candidates. In this embodiment of the present invention, description will be directed to a case where image capture modes are, for example, a Landscape mode, a High-speed Shutter mode, a Night View mode, a Fireworks mode, a Night View and Portrait mode, a High Sensitivity mode, a Snow mode, a Beach mode, a Subject Tracking mode, an Underwater mode, and a Portrait mode. The Landscape mode is an image capture mode in which the focus tends to be on distant scenery and which is suitable for shooting landscapes such as sky, sea, or mountains. The High-speed Shutter mode is an image capture mode suitable for shooting the motion of a subject without blurring. The Night View mode is an image capture mode for shooting night views beautifully without spoiling the atmosphere. The Fireworks mode is an image capture mode suitable for shooting fireworks such as skyrocket beautifully. The Night View and Portrait mode is an image capture mode suitable for shooting night views beautifully together with a person. The High Sensitivity mode is an image capture mode for automatically setting a sensitivity suitable for each individual image capture scene, whereby shooting can be performed under a natural atmosphere without the flash. The Snow mode is an image capture mode for preventing white color from becoming grayish when shooting snowy scenes or the like. The Beach Mode is an image capture mode for reproducing the blue color of water or the like more vividly. The Subject Tracking mode is an image capture mode for capturing fast-moving subjects while preventing blurring, and is suitable for shooting dynamic images. The Underwater mode is an image capture mode suitable for shooting the color of water beautifully. The Portrait mode is an image capture mode suitable for shooting a person as a subject, whereby a person in the foreground can be isolated against a blurred background.

In the image capture mode storing section 250, Brightness Histogram 252, Hue Information 253, and Motion Value 257 are stored as feature values, and Face 254, Face Size 255, and Face Position 256 are stored as face-related information. It should be noted that these are only exemplary, and feature values including image information such as focal length information or auto-focus position information, face-related information, and the like may be stored as the selection conditions to be used for determination.

The Brightness Histogram 252 is used when executing pattern matching of the brightness histogram of the entire screen of a captured image.

The Hue Information 253 is information including a hue that exists on the screen of a captured image, and a position at which the hue exists. The Hue Information 253 is used when identifying sea, snowy mountains, underwater, and the like, for example.

The Face 254 is used when determining whether or not a face detected from a captured image is a main subject. It should be noted that in FIG. 4, letters "Main" are shown in the field of an image capture mode that is selected if it is determined that the detected face is a main subject.

The Face Size 255 is used when determining whether or not the size of a face detected from a captured image falls within a specified range. It should be noted that in FIG. 4, letters "Within Specified Range" are shown in the field of an image capture mode that is selected if it is determined the size of the face falls within the specified range.

The Face position 256 is used when determining whether or not the position of a face detected from a captured image falls within a specified range. It should be noted that in FIG. 4, letters "Within Specified Range" are shown in the field of an image capture mode that is selected if it is determined the position of the face falls within the specified range.

The Motion 257 is a motion vector indicating the amount of motion in a captured image, and is used to estimate the moving condition of a subject. It should be noted that in FIG. 4, letters "Large" are shown in the field of an image capture mode that is selected if it is determined that the amount of motion in a captured image is large, and letters "None" are shown in the field of an image capture mode that is selected if it is determined that there is no motion in a captured image. For example, if all of the selection conditions of the Face 254, Face Size 255, Face Position 256, and Motion Value 257 are met, only the Portrait mode is selected as an image capture mode candidate.

Next, a detailed description will be given of a selection method of selecting image capture mode candidates from image capture modes stored in the image capture mode storing section 250, with reference to the drawings.

Figure 5:
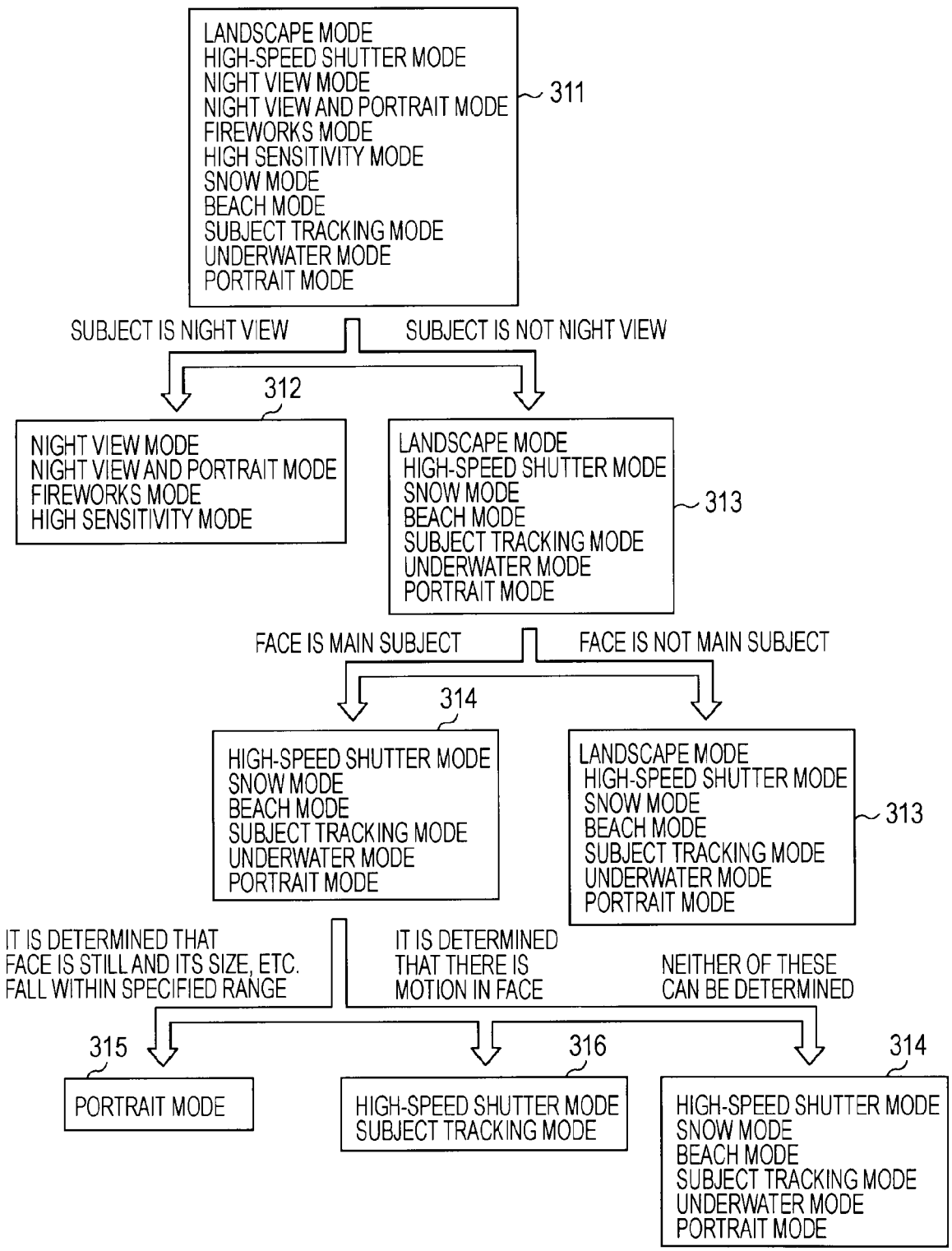
FIG. 5 is a diagram schematically showing a selection method of selecting image capture modes suitable for a subject in a captured image as image capture mode candidates.

FIG. 5 is a diagram schematically showing a selection method of selecting image capture modes suitable for a subject in a captured image as image capture mode candidates, from among image capture modes stored in the image capture mode storing section 250.

Here, a description will be given of a case in which image capture modes are selected on the basis of whether or not a subject in a captured image is a night view scene, and a face include in the captured image. Here, for example, a group of image capture modes including all the image capture modes stored in the image capture mode storing section 250 is set as a group A (311), a group of image capture modes including image capture modes suitable for capturing night view scenes is set as a group B (312), and a group of image capture modes including image capture modes suitable for capturing scenes that are not night view scenes is set as a group C (313). Further, for example, of the image capture modes included in the group C (313), a group of image capture modes including image capture modes suitable for capturing scenes with a face as a main subject is set as a group D. Further, for example, of the image capture modes included in the group D (314), a group of image capture modes including image capture modes suitable for capturing scenes in which a face is still and the size and position of the face falls within a specified range is set as a group E (315), and a group of image capture modes including image capture modes suitable for capturing scenes in which there is a certain motion in the face is set as a group F (316).

First, it is determined whether or not a subject in the current captured image is a night view scene. If it is determined as a result of this determination that the current captured image is an image of a night view scene, image capture modes suitable for capturing night view scenes are selected from among the image capture modes included in the group A (311). For example, if it is determined that the current captured image is an image of a night view scene, the image capture modes included in the group B (312) are selected from among the image capture modes included in the group A (311). On the other hand, if it is determined that the current captured image is not an image of a night view scene, the image capture modes included in the group C (313) are selected from among the image capture modes included in the group A (311).

In this way, if it can be determined that a subject is a night view scene, image capture modes that are considered to be irrelevant (the Landscape mode, the High-speed Shutter mode, the Snow mode, the Beach mode, the Subject Tracking mode, the Underwater mode, and the Portrait mode) can be excluded from the image capture modes included in the group A (311). It should be noted that if it can be determined that a subject is a night view scene, the subject is a dark scene, so there are cases where, undesirably, no face is detected. Accordingly, since there is a possibility that a face is included in the subject, the Night View and Portrait mode is not excluded.

On the other hand, if it is determined that a subject is not a night view scene, image capture modes that are considered to be irrelevant (the Night View mode, the Fireworks mode, the Night View and Portrait mode, and the High Sensitivity mode) can be excluded from the image capture modes included in the group A (311).

Subsequently, it is determined whether or not a face detected from the current captured image is a main subject. If it is determined as a result of this determination that the detected face is a main subject, image capture modes suitable for capturing scenes with the detected face as a main subject are selected from among the image capture modes included in the group C (313). For example, if it is determined that a face detected from the current captured image is a main subject, the image capture modes included in the group D (314) are selected from among the image capture modes included in the group C (313). On the other hand, if it is determined that a face detected from the current captured image is not a main subject, or if no face has been detected from the current captured image, the image capture modes included in the group C (313) are selected as they are.

Subsequently, it is determined whether or not the face determined as being a main subject is still and the size and position of the face falls within a specified range. If it is determined as a result of this determination that the face determined as being a main subject is still and the size and position of the face falls within a specified range, image capture modes suitable for capturing scenes with a still face as a main subject are selected from among the image capture modes included in the group C (313). For example, if it is determined that the face determined as being a main subject is still and the size and position of the face falls within a specified range, the Portrait mode as an image capture mode included in the group E (315) is selected from among the image capture modes included in the group D (314).

On the other hand, if it is determined that the face determined as being a main subject is not still, or if it is determined that the size and position of the face do not fall within a specified range, it is determined whether or not there is a certain motion in the face determined as being a main subject. This certain motion is determined by means of a motion vector. For example, if it is determined that there is a certain motion in the face determined as being a main subject, the image capture modes included in the group F (316) are selected from among the image capture modes included in the group D (314). On the other hand, if it is determined that the face determined as being a main subject is not still, if it is determined that the size and position of the face do not fall within a specified range, and if it is determined that there is a certain motion in the face determined as being a main subject, the image capture modes included in the group D (314) are selected as they are. In the image capture mode candidate selection process as described above, it is crucial to know what the main subject is. Also, it is very effective to use face information. For example, consider a case where a face is present under a condition in which the subject is determined as not being a night view. In this case, if it can be determined that the face is a main subject by using information such as the position, size, and distance of the face, as indicated in the group D (314), the Landscape mode can be excluded. Further, if the face is still, and the size and position of the face meet specified conditions, as indicated in the group E (315), the Portrait mode that is the optimal mode for shooting scenes specialized in faces can be selected as an image capture mode candidate. On the other hand, if it is determined that the face is in motion, as indicated in the group F (316), it is optimal to select the Subject Following Mode and the High-speed Shutter mode as image capture mode candidates. In this way, appropriate image capture modes can be selected on the basis of the relative relationship between the detected face and the captured image in the background thereof. It should be noted that if neither a transition to the group E (315) nor a transition to the group F (316) has taken place, as shown in FIGS. 6A and 6B, image capture mode candidates can be narrowed down by further making an underwater scene determination or snowy mountain scene determination.

While the foregoing description is directed to an example where image capture mode candidates are selected on the basis of whether or not a scene of a captured image is a night view scene, and a face included in the captured image, image capture mode candidates may be selected on the basis of other conditions (for example, determination using hue information), or image capture mode candidates may be selected by using a combination of these methods. Further, while the foregoing description is directed to an example where first a determination is made as to whether or not a scene of a captured image is a night view scene and then a determination with respect to a face is made, a determination as to whether or not a scene of a captured image is a night view scene may be made after making a determination with respect to a face first, or other combinations of such determinations may be made in a predetermined order.

Next, a specific image capture mode determination process will be described in detail with reference to the drawings.

Figure 6A:
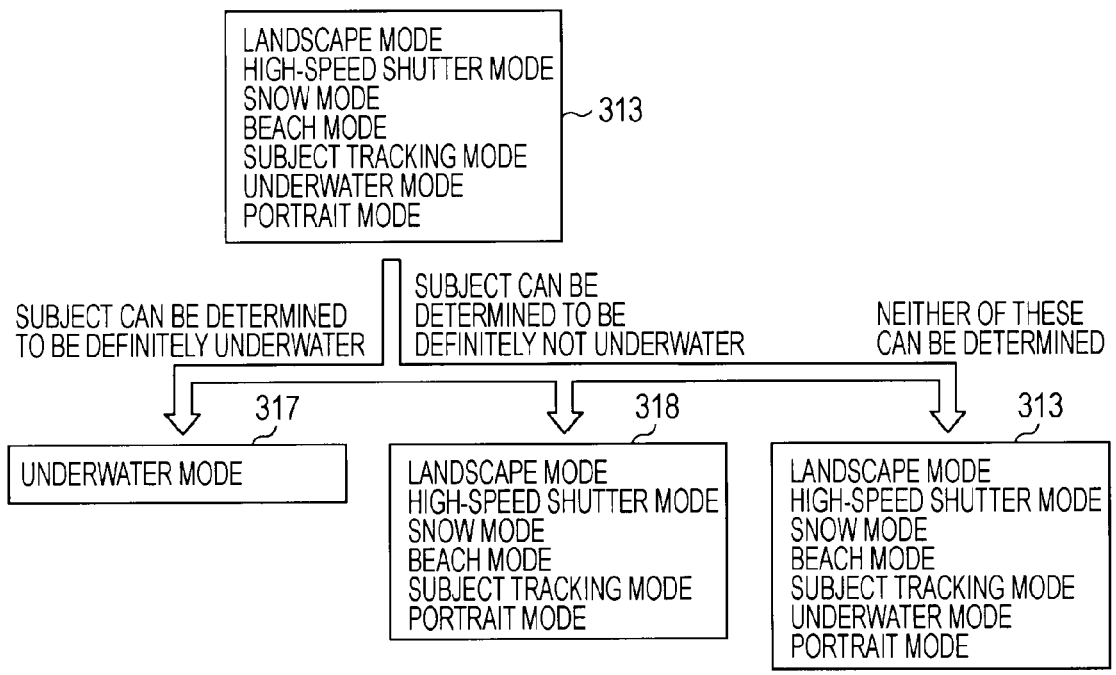
FIG. 6 is a diagram schematically showing a selection method of selecting image capture modes suitable for a subject in a captured image as image capture mode candidates.
Figure 6B:
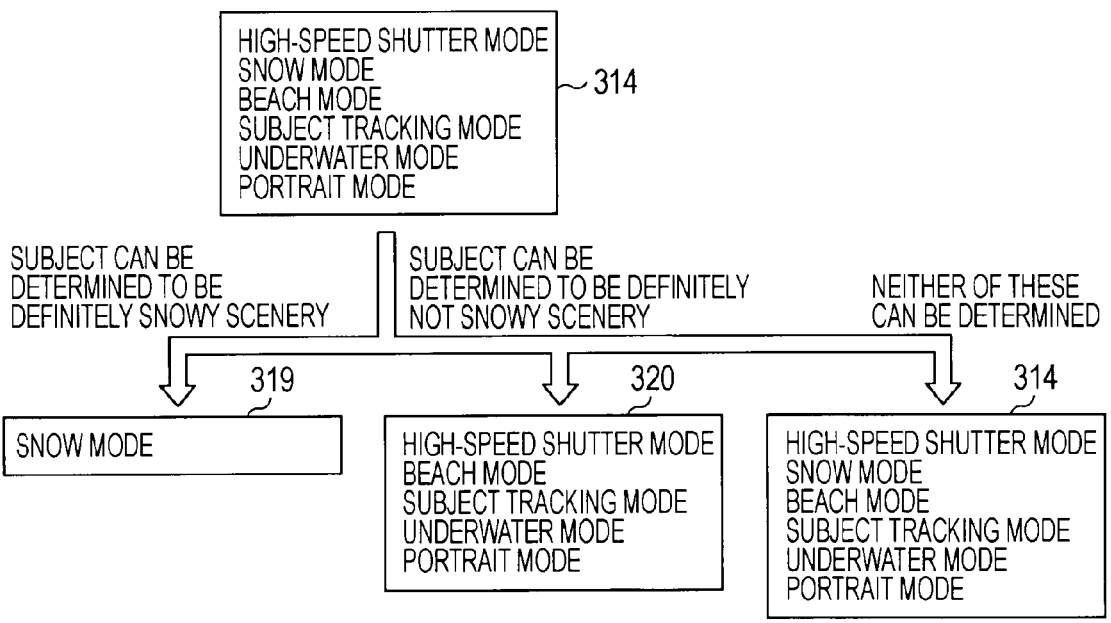

FIGS. 6A and 6B are diagrams schematically showing a selection method of selecting image capture modes suitable for a subject in a captured image as image capture mode candidates from among image capture modes stored in the image capture mode storing section 250. Here, a description will be given of an example in which image capture mode candidates are selected on the basis of whether or not a subject in a captured image can be definitely determined to be a specific scene, and whether or not the subject can be definitely determined not to be a specific scene.

FIG. 6A is a diagram schematically showing a selection method in a case where image capture mode candidates are selected from the group C (313) shown in FIG. 5, by using an underwater scene as a specific scene. This underwater scene determination can be made on the basis of, for example, hue information.

First, it is determined whether or not a subject in the current captured image can be definitely determined to be underwater. If it is definitely determined that the subject is underwater, the Underwater mode (group G (317)), which is an image capture mode suitable for capturing underwater scenes, is selected from among the image capture modes included in the group C (313). On the other hand, in a case where it is not definitely determined that a subject in the current captured image is underwater, if it is definitely determined that the subject in the current captured image is not underwater, image capture modes other than the Underwater mode are selected from among the image capture modes included in the group C (313). For example, a group of image capture modes obtained by excluding the Underwater mode from the image capture modes included in the group C (313) is set as a group H (318).

Further, if it cannot be definitely determined that a subject in the current captured image is underwater, and if it cannot be definitely determined that the subject in the current captured image is not underwater, the image capture modes included in the group C (313) are selected as they are.

FIG. 6B is a diagram schematically showing a selection method in a case where image capture mode candidates are selected from the group D (314) shown in FIG. 5, by using a snowy scenery as a specific scene.

First, it is determined whether or not it can be definitely determined that a subject in the current captured image is a snowy scenery. If it is definitely determined that the subject is a snowy scenery, the Snow mode (group I (319)), which is an image capture mode suitable for capturing snowy sceneries, is selected from among the image capture modes included in the group D (314). On the other hand, in a case where it is not definitely determined that a subject in the current captured image is a snowy scenery, if it is definitely determined that the subject in the current captured image is not a snowy scenery, image capture modes other than the Snow mode are selected from among the image capture modes included in the group D (314). For example, a group of image capture modes obtained by excluding the Snow mode from the image capture modes included in the group D (314) is set as a group J (319).

Further, if it cannot be definitely determined that a subject in the current captured image is a snowy scenery, and if it cannot be definitely determined that the subject in the current captured image is not a snowy scenery, the image capture modes included in the group D (314) are selected as they are.

In this way, if it can be definitely determined on the basis of hue information that a subject in the current captured image is not underwater, the Underwater mode can be excluded. Likewise, if it can be definitely determined that the subject is not a snowy scenery, the Snow mode can be excluded, and if it can be definitely determined that the subject is not sea, the Beach mode can be excluded. The same applies to scenes other than those mentioned above.

As described above, when determining a subject or a scene, it is often easier to conclusively ascertain that a subject or scene is not a specific scene than to conclusively ascertain that a subject or scene is a specific scene. In such a case, it is effective to use the specific image capture mode determination process shown in FIGS. 6A and 6B. It should be noted that if it is possible to conclusively ascertain that a subject or scene is a specific scene, a single image capture mode candidate is determined.

Next, a method of displaying selected image capture mode candidates will be described in detail with reference to the drawings.

Figure 10A:
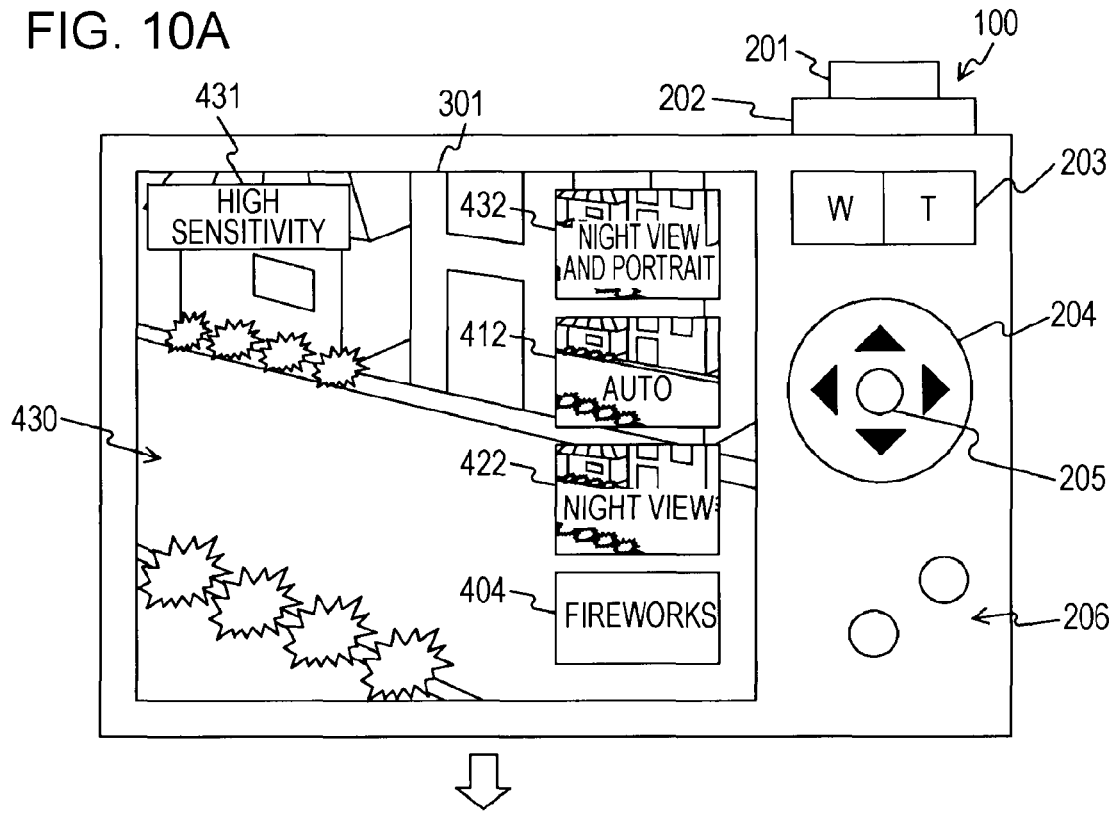
FIGS. 10A and 10B are views each showing an example of display of a captured image and image capture mode setting buttons.
Figure 10B:
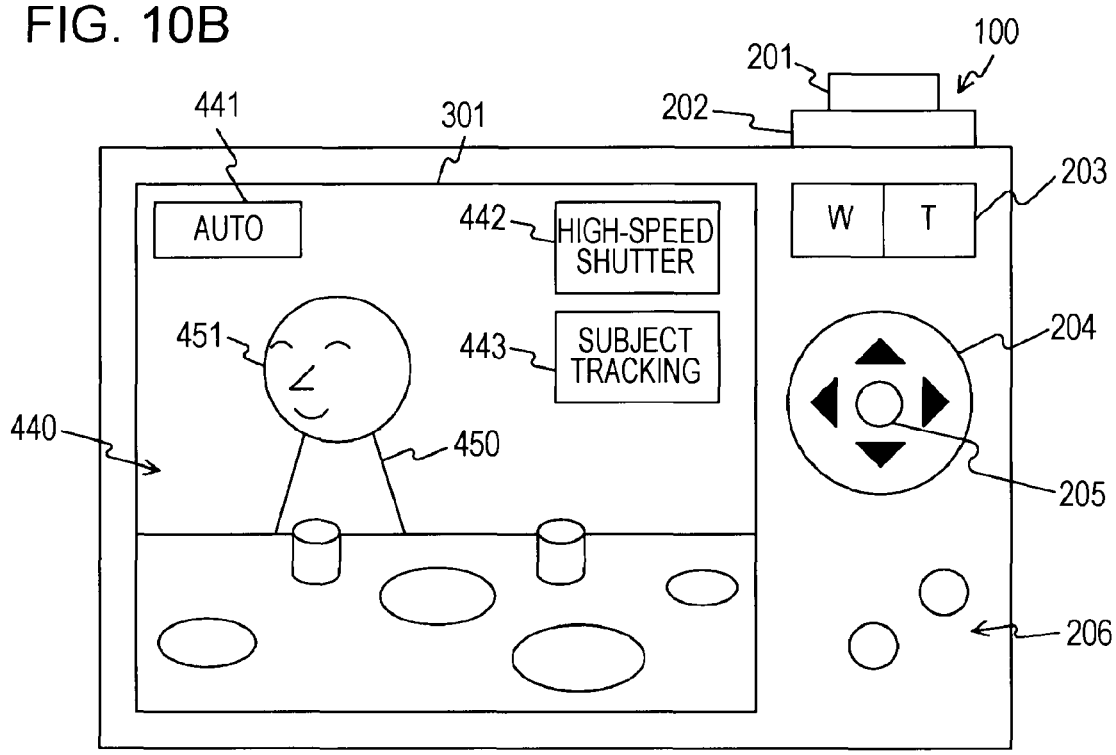

FIGS. 7A to 10B are views each showing an example of display of a captured image and image capture mode setting buttons. It should be noted that FIGS. 7A and 7B each show an example of display in a case where the user is capturing an image of a person 358 walking in an urban area at midday with the image capturing apparatus 100. Further, FIGS. 8A and 8B, 9A and 9B, and 10A each show an example of display in a case where the user is capturing an image of an urban area at night with the image capturing apparatus 100. Further, FIG. 10B shows an example of display in a case where an image of a person 450 moving at a certain speed under fluorescent lighting in a room is being captured with the image capturing apparatus 100.

FIG. 7A shows a case where the user is capturing an image of the person 358 walking in an urban area at midday with the image capturing apparatus 100, and it is determined that a face 359 of the person 358 is not a main subject due to its relatively small size. Thus, the image capture modes included in the group C (313) shown in FIG. 5 are selected as image capture mode candidates, and indicators indicating the image capture modes included in the group C (313) are displayed as image capture mode setting buttons.

As shown in FIG. 7A, when a captured image 350 outputted from the DSP 115 is displayed on the liquid crystal display section 301, image capture mode setting buttons 351 to 354 corresponding to image capture mode candidates selected for the captured image 350 are displayed so as to be superimposed on the captured image 350. It should be noted that a current image capture mode display area 355 is provided in an upper left portion of the liquid crystal display portion 301. The image capture mode of the captured image being currently displayed is displayed in the current image capture mode display area 355. For example, if the currently set image capture mode is the Standard mode (so-called AUTO setting) that is the initial setting of the image capturing apparatus 100, letters "AUTO" are displayed in the current image capture mode display area 355. This allows the user to easily recognize that the captured image 350 being currently displayed on the liquid crystal display section 301 is an image captured in the Standard mode as the image capture mode. It should be noted that when image capture mode candidates are selected for the captured image 350, the image capture mode candidate determined to have the highest likelihood among the selected image capture mode candidates may be automatically set as the current image capture mode.

Here, an image capture mode setting button is an indicator which indicates an image capture mode candidate selected with respect to the current captured image, and includes at least one of a letter, a symbol, a numeral, and a figure related to the selected image capture mode candidate. Further, this icon may be set as an icon including a combination of an image, a letter, a symbol, a numeral, and the like. For example, as shown in FIG. 7A, the image capture mode setting buttons 351 to 354 are each displayed as a square area including letters indicating a selected image capture mode. Here, the image capture mode setting button 351 is a button used for setting the High-speed Shutter mode, the image capture mode setting button 352 is a button used for setting the Snow mode, the image capture mode setting button 353 is a button used for setting the Beach mode, and the image capture mode setting button 354 is a button used for setting the Subject Tracking mode.

FIG. 7B shows a case where the user is capturing an image of the person 358 walking in an urban area at midday with the image capturing apparatus 100, and it is determined that the face 359 of the person 358 is a main subject due to its relatively large size. In the illustrated case, since the person 258 is walking slowly, it is not determined that there is a motion in the face 359, and thus the group D (314) shown in FIG. 5 is maintained as image capture mode candidates. In this case, the image capture modes included in the group D (314) are selected, and indicators indicating the image capture modes included in the group D (314) are displayed as image capture mode setting buttons.

Further, as in FIG. 7A, when a captured image 360 outputted from the DSP 115 is displayed on the liquid crystal display section 301, image capture mode setting buttons 361 to 364 corresponding to image capture mode candidates selected for the captured image 360 are displayed so as to be superimposed on the captured image 360. Here, the image capture mode setting button 361 is a button used for setting the Portrait mode, the image capture mode setting button 362 is a button used for setting the Subject Tracking mode, the image capture mode setting button 363 is a button used for setting the High-speed Shutter mode, and the image capture mode setting button 364 is a button used for setting the Beach mode. Further, letters "AUTO" are displayed in a current image capture mode display area 365.

It should be noted that while the description of FIGS. 7A and 7B, 8A and 8B, 9A and 9B, and 10A is directed to an example in which four image capture mode setting buttons are arranged side by side, three or less, or five or more image capture setting buttons may be displayed. If the number of selected image capture modes is larger than the number of image capture mode setting buttons that can be displayed, only the number of image capture mode setting buttons that can be displayed may be displayed, and other image capture mode setting buttons may be scroll-displayed. For example, scroll display may be performed by using a scroll button 356 or 357 shown in FIG. 7A, or a scroll button 366 or 367 shown in FIG. 7B. Further, the display area or layout of image capture mode setting buttons 301 may be changed in accordance with the number of selected image capture modes.

Now, a description will be given of the display order of image capture mode setting buttons displayed on the liquid crystal display section 301.

Image capture mode setting buttons can be displayed in a display order determined in advance, or in a randomly determined order. Further, a history of selecting operations made for image capture mode setting buttons displayed in the past may be retained so that image capture mode setting buttons are displayed in order of decreasing frequency of selection. Further, in accordance with the subject included in a captured image, image capture mode setting buttons may be displayed in order from the highest possibility of use, or image capture mode candidates corresponding to a scene determined as having the highest probability may be displayed in preference to other image capture mode candidates. For example, as shown in FIG. 5, if it is determined that a subject included in a captured image is not a night view, and a face is not a main subject, the scene of the subject included in the captured image has not been definitely recognized, so the image capture modes included in the group C can be displayed in a predetermined display order, or in a randomly determined order. For example, as shown in FIG. 7A, the image capture mode setting buttons 351 to 354 can be displayed.

Further, consider a case where, as shown in FIG. 5, although the subject is a face, it is determined that neither of the above-mentioned determinations with respect to the size and motion of the face can be definitely made, and thus the group D is maintained. In this case, since it has been determined that the face is a main subject, it is highly likely that shooting will mainly focus on the face. Therefore, the probability of the Portrait mode being the optimal image capture mode becomes high. Further, since a person may suddenly move, the probability of the Subject Tracking mode being the optimal image capture mode also becomes high. Further, if a person suddenly moves, the probability of the High-speed Shutter mode being the optimal image capture mode also becomes high. Accordingly, for example, the image capture mode setting buttons 361 to 364 can be displayed in the manner as shown in FIG. 7B. In this way, the display order of image capture mode setting buttons can be changed in accordance with the subject included in a captured image.

When image capture mode setting buttons corresponding to selected image capture mode candidates are displayed side by side so as to provide a list of all or some of the image capture mode setting buttons in this way, the optimal image capture mode adapted to user preferences can be selected with ease.

Figure 8A:
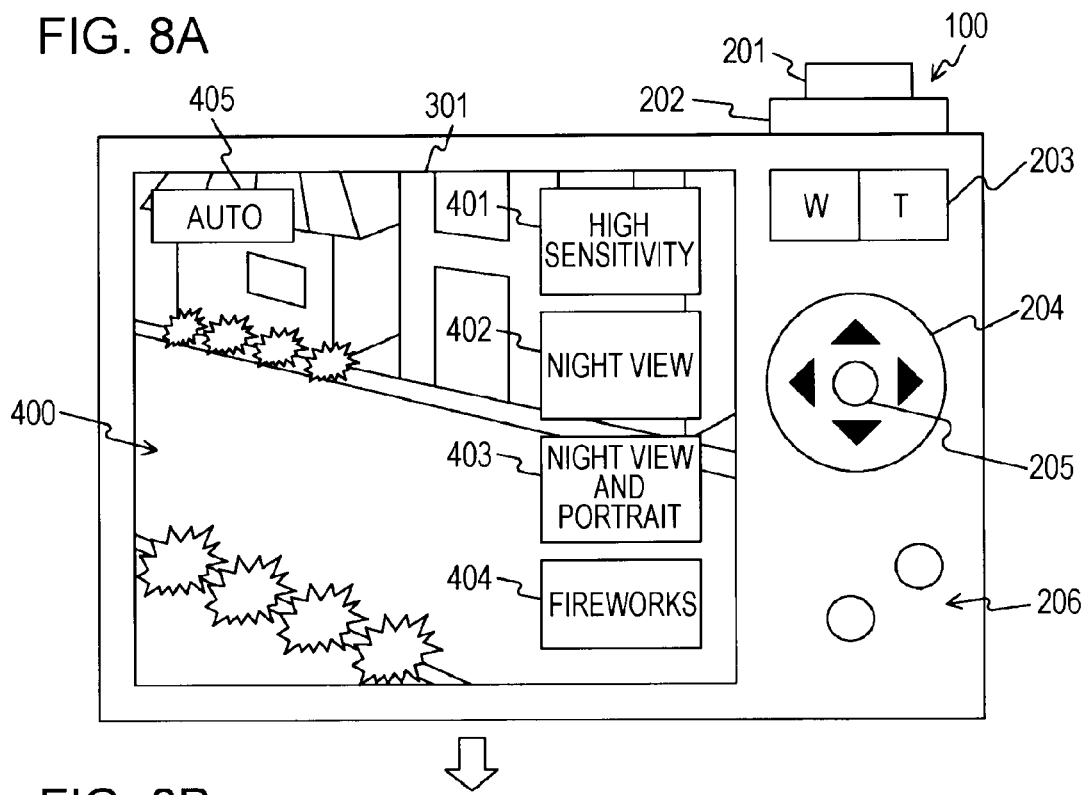
FIGS. 8A and 8B are views each showing an example of display of a captured image and image capture mode setting buttons.

FIG. 8A shows an example of display in a case where the user is capturing an image of an urban area at night with the image capturing apparatus 100. Thus, the image capture modes included in the group B (312) shown in FIG. 5 are selected, and indicators indicating the image capture modes included in the group B (312) are displayed as image capture mode setting buttons 401 to 404.

Further, as in FIG. 7A, when a captured image 400 outputted from the DSP 115 is displayed on the liquid crystal display section 301, the image capture mode setting buttons 401 to 404 corresponding to image capture mode candidates selected for the captured image 400 are displayed so as to be superimposed on the captured image 400. Here, the image capture mode setting button 401 is a button used for setting the High Sensitivity mode, the image capture mode setting button 402 is a button used for setting the Night View mode, the image capture mode setting button 403 is a button used for setting the Night View and Portrait mode, and the image capture mode setting button 404 is a button used for setting the Fireworks mode. Further, letters "AUTO" are displayed in a current image capture mode display area 405.

Now, a description will be given of a case of setting image capture modes corresponding to the image capture mode setting buttons 401 to 404. A captured image displayed on the liquid crystal display section 301 is an image captured in the image capture mode being currently set. For example, in FIG. 8A, since "AUTO" is displayed in the current image capture mode display area 405, an image captured in the Standard mode is displayed as the captured image 400. When setting image capture modes corresponding to the image capture mode setting buttons 401 to 404, a desired image capture mode setting button is selected by depressing the up/down button of the up/down/left/right operating button 204. Then, by depressing (by making a selecting operation on) the Enter button 205 in a state with the desired image capture mode setting button selected, a desired image capture mode can be set.

Next, an example of display after an image capture mode selecting operation is made will be described in detail with reference to the drawings.

Figure 8B:
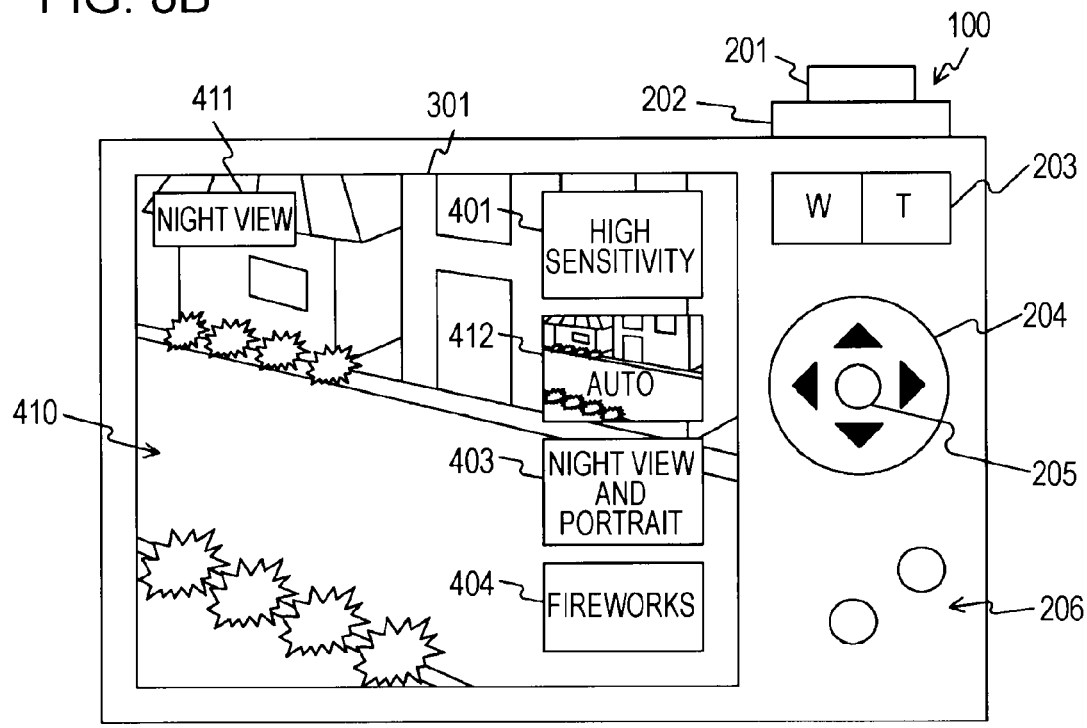

FIG. 8B is a view showing an example of display in a case when the image capture mode setting button 402 is determined from among the image capture mode setting buttons 401 to 404 displayed on the liquid crystal display section 301 shown in FIG. 8A. As shown in FIG. 8B, when the image capture mode setting button 402 for setting the Night View mode is determined by the user, a captured image in which the image capture conditions for the Night View mode are reflected is displayed on the liquid crystal display section 301. For example, a captured image 410 is an image in which the image capture conditions for the Night View mode are reflected. Further, letters "Night View" indicating the selected image capture mode are displayed in a current image capture mode display area 411.

In the area where the image capture mode setting button 402 was displayed, an image capture mode setting button indicating the image capture mode that had been set until immediately before the selecting operation on the image capture mode setting button 402 is displayed. For example, in the liquid crystal display section 301 shown in FIG. 8B, an image capture mode setting button 412 for setting the Standard mode is displayed. Further, in the area where the image capture mode setting button 402 was displayed, the captured image 400, which had been displayed on the liquid crystal display section 301 until immediately before the selecting operation on the image capture mode setting button 402, is displayed as a reduced image. For example, as shown in FIG. 8B, in the area of the image capture mode setting button 412, letters "AUTO" are displayed together with the reduced image of the captured image 400. It should be noted that the reduced image of a captured image continues to be displayed in the area of the image capture mode setting button unless a subject changes by a certain amount or more.

FIG. 9A is a view showing an example of display in a case where the image capture mode setting button 403 is selected from among the image capture mode setting buttons 401, 403, 404, and 412 displayed on the liquid crystal display section 301 shown in FIG. 8B. As shown in FIG. 9A, when the image capture mode setting button 403 for setting the Night View and Portrait mode is determined by the user, a captured image in which the image capture conditions for the Night View and Portrait mode are reflected is displayed on the liquid crystal display section 301. For example, a captured image 420 is an image in which the image capture conditions for the Night View and Portrait mode are reflected. Further, letters "Night View and Portrait" indicating the selected image capture mode are displayed in a current image capture mode display area 421. Further, the captured image 410, which was displayed in the Night View mode on the liquid crystal display section 301 at the time of selection of the image capture mode setting button 403, is reduced, and this reduced image of the captured image 410 is displayed as a Night View mode setting button 422 in the display area where the image capture mode setting button 403 had been displayed.

FIG. 9B is a view showing an example of display in a case where the image capture mode setting button 401 is selected from among the image capture mode setting buttons 401, 404, 412, and 422 displayed on the liquid crystal display section 301 shown in FIG. 9A. As shown in FIG. 9B, when the image capture mode setting button 401 for setting the High Sensitivity mode is determined by the user, a captured image in which the image capture conditions for the High Sensitivity mode are reflected is displayed on the liquid crystal display section 301. For example, a captured image 430 is an image in which the image capture conditions for the High Sensitivity mode are reflected. Further, letters "High Sensitivity" indicating the selected image capture mode are displayed in a current image capture mode display area 431. Further, the captured image 420, which was displayed in the Night View and Portrait mode on the liquid crystal display section 301 at the time of selection of the image capture mode setting button 401, is reduced, and this reduced image of the captured image 420 is displayed as an image capture mode setting button 432 in the display area where the image capture mode setting button 401 was displayed.

In this way, in the display area of an image capture mode setting button on which a selecting operation has been made, a reduced image of a captured image that was displayed at the time of the selection is sequentially displayed as an image capture mode setting button, thereby making it possible to easily check a history of past selections. Thus, for example, in a case where the user sets the image capture mode to the Night View and Portrait mode after setting the Night View mode but the user does not like an image captured under the Night View and Portrait mode setting, the user can quickly look at images previously captured in the Night View mode, together with other image capture conditions. Further, the user can easily judge whether or not to select another image capture mode, or whether or not to capture an image by returning the image capture mode to the Night View mode. Further, images captured in image capture modes previously tried by the user, and an image captured in the current image capture mode can be easily compared with each other visually. This facilitates the user's selection of an image capture mode. Since letters indicating the image capture mode being currently set are displayed in an upper left portion of the liquid crystal display section 301, it is possible to prevent a situation where the user does not know which image capture mode is being currently set. Further, letters indicating an image capture mode is attached to each image capture mode setting button including a reduced image corresponding to a previously captured image so as to be superimposed on the reduced image, thereby making it possible for the user to easily recognize the correspondence between the image capture mode and the reduced image. Further, by looking at the reduced image, the user can easily recognize visually what kind of setting changes has been actually made. Thus, when returning the setting to a desired setting after trying several other settings, the setting can be quickly returned to the desired setting without selecting a wrong setting.

FIGS. 10A and 10B are views each showing an example of display of a captured image and image capture mode setting buttons in a case where a change of a certain amount or more has occurred in a subject. In this embodiment of the present invention, even when image capture mode candidates are selected on the basis of a subject in a captured image, and image capture mode setting buttons indicating these image capture mode candidates are displayed on the liquid crystal display section 301, the process of selecting an image capture mode candidate continues to be carried out in the background. Thus, there is a possibility that the configuration of image capture mode setting buttons displayed on the liquid crystal display section 301 is changed in accordance with a change in the subject.

FIG. 10A is a view showing the same example of display as the example of display shown in FIG. 9A. FIG. 10B is a view showing an example of display in a case when an image of the person 450 who is moving at a certain speed under fluorescent lighting in a room is being captured. As shown in FIG. 10A, in a case where the user is capturing an image of an urban area at night with the image capturing apparatus 100, when the image capturing apparatus 100 is panned to capture the person 450 who is present under fluorescent lighting in a room, as shown in FIG. 10B, a change of a certain amount or more occurs in a subject. In this case, image capture mode setting buttons indicating image capture mode candidates selected with respect to the current subject are displayed on the liquid crystal display section 301. For example, image capture mode setting buttons 442 and 443 indicating the High-speed Shutter mode and the Subject Tracking mode included in the group F (316) shown in FIG. 5 are displayed.

When the scene of a subject has changed greatly as in the case of the transition from the captured image 430 shown in FIG. 10A to the captured image 440 shown in FIG. 10B (for example, when a change has taken place from capturing of a night view scene in the outdoors to capturing of a scene under fluorescent lighting in a room), it is frequently the case that the reduced images displayed in the areas of respective image capture mode setting buttons at the time of this change do not serve as a reference for image capture after the change. For this reason, after the scene of a subject has changed greatly, image capture mode setting buttons including no reduced image are displayed. For example, as shown in FIG. 10B, image capture mode setting buttons 442 and 443 each including letters indicating a selected image capture mode candidate are displayed.

If the display of image capture mode setting buttons is changed immediately after the scene of a subject has changed greatly as described above, there is a possibility that the display of image capture mode setting buttons will be changed frequently, which may lead to situations where the display of image capture mode setting buttons is changed against the will of the user. Accordingly, a configuration may be adopted in which when the scene of a subject has changed greatly, the display of image capture mode setting buttons is not changed until a predetermined period of time elapses, and the display of image capture mode setting buttons is changed after the elapse of the predetermined period of time.

Further, when changing the display of image capture mode setting buttons after the scene of a subject has changed greatly as described above, a message stating that the current image capture mode candidates are no longer optimal may be displayed on the liquid crystal display section 301. Alternatively, a display selection button for selecting whether or not to change to a display of optimal image capture mode setting buttons for the current subject may be displayed on the liquid crystal display section 301 so that new image capture mode setting buttons are displayed only when this display selection button is depressed.

Next, the operation of the image capturing apparatus 100 according to an embodiment of the present invention will be described with reference to the drawings.

Figure 11:
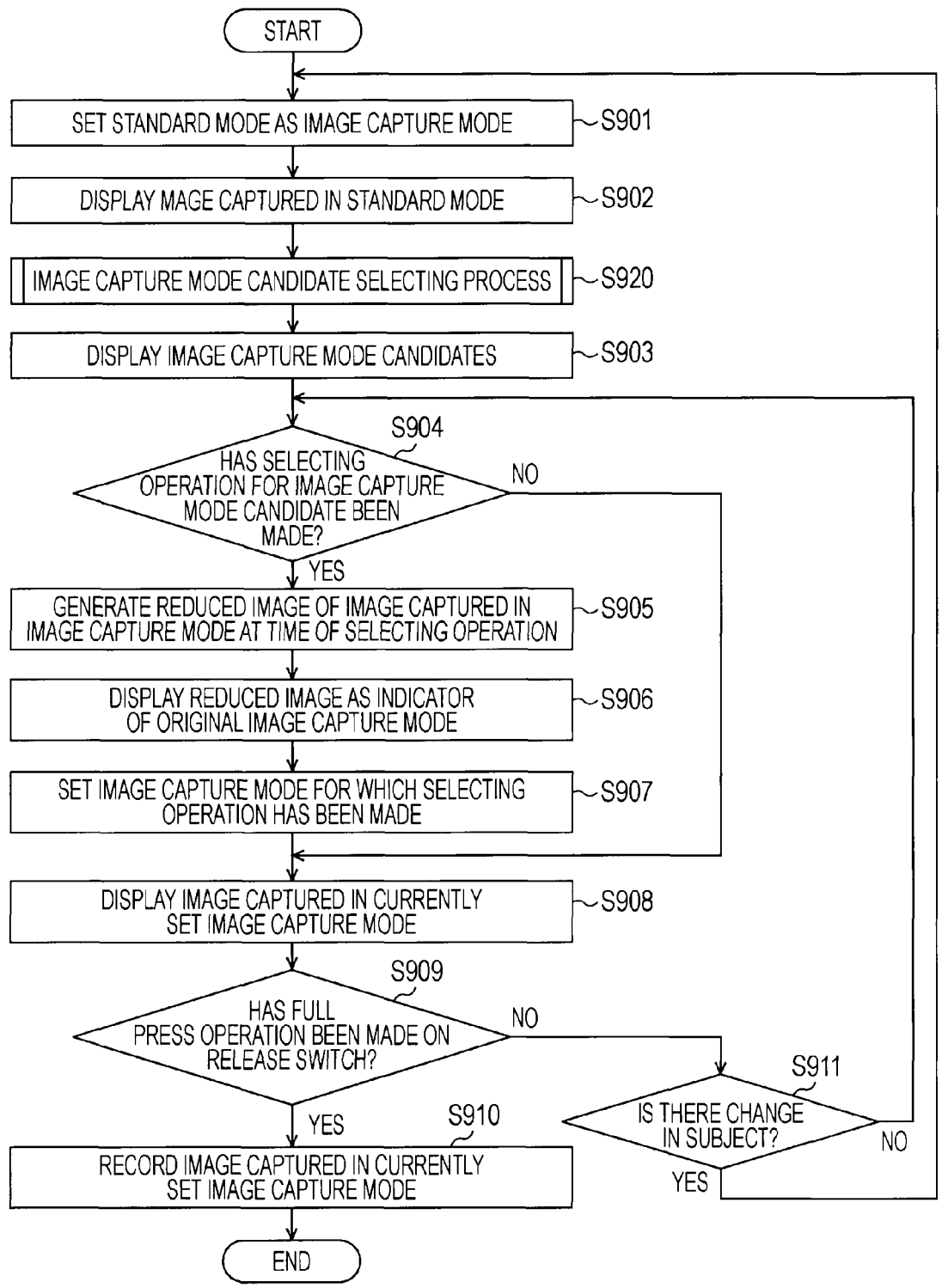
FIG. 11 is a flowchart showing the procedure of an image capture mode candidate display process performed by an image capturing apparatus.

FIG. 11 is a flowchart showing the procedure of an image capture mode candidate display process performed by the image capturing apparatus 100.

First, the Standard mode as a standard image capture mode is set as the current image capture mode (step S901). Then, an image captured in the Standard mode is displayed on the display section 300 (step S902). Then, an image capture mode candidate selection process is executed (step S920). It should be noted that this image capture mode candidate selection process will be described later in detail with reference to FIG. 12.

Then, image capture mode setting buttons corresponding to selected image capture mode candidates are displayed on the display section 300. Then, it is determined whether or not a selecting operation has been made by the user with respect to the image capture mode setting buttons displayed on the display section 300 (step S904). If a selecting operation has not been made by the user with respect to the image capture mode setting buttons displayed on the display section 300 (step S904), a captured image captured in the current set image capture mode is displayed on the display section (step S908). On the other hand, if a selecting operation has been made by the user with respect to the image capture mode setting buttons displayed on the display section 300 (step S904), a captured image captured at the time of this select operation in the image capture mode set at the time of this selecting operation is reduced to create a reduced image (step S905). Then, in the area where the image mode setting button for which a selecting operation has been made was displayed, as an image capture mode setting button corresponding to the image capture mode that was set at the time of the selecting operation, letters indicating that image capture mode are displayed so as to be superimposed on the created reduced image (step S906).

Then, an image capture mode corresponding to the image capture mode setting button for which a selecting operation has been made is set (step S907). Then, a captured image captured in the currently set image capture mode is displayed on the display section 300 (step S908).

Then, it is determined whether or not a full-press operation on the release switch 201 has been made by the user (step S909). If a full-press operation on the release switch 201 has been made by the user (step S909), a captured image captured in the currently set image capture mode is recorded onto the recording device 117 (step S910). On the other hand, if a full-press operation on the release switch 201 has not been made by the user (step S909), it is determined whether or not a change in subject is determined to have occurred (step S911). If a change in subject is determined to have occurred (step S911), the process returns to step S901, and the image capture mode candidate display process is repeated (steps S901 to S909, and S920). On the other hand, if a change in subject is not determined to have occurred (step S911), there is no need to select new image capture mode candidates, so the process returns to step S904, and the image capture mode candidate selection process is repeated (steps S904 to S909). It should be noted that the subject change determination will be described later in detail with reference to FIG. 14.

Figure 12:
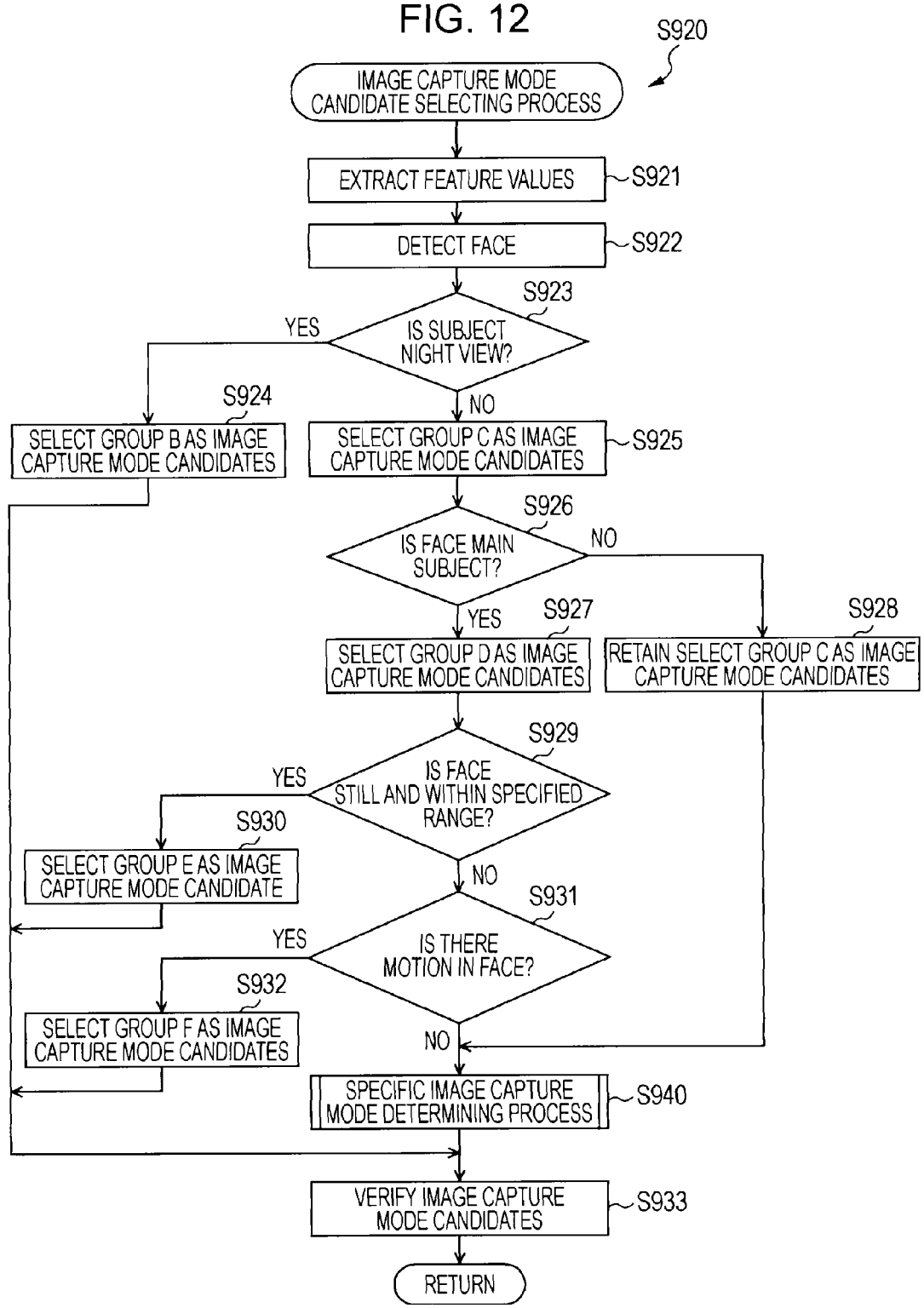
FIG. 12 is a flowchart showing an image capture mode candidate selecting procedure performed by an image capturing apparatus.

FIG. 12 is a flowchart showing an image capture mode candidate selection procedure (the procedure of step S920 shown in FIG. 11) of the procedure of the image capture mode candidate display process performed by the image capturing apparatus 100. Here, a description will be given of an example in which image capture mode candidates are selected on the basis of the presence/absence of a night view and a detected face, and image capture mode candidates are further selected on the basis of various feature values from among the selected image capture mode candidates.

First, feature values are extracted from a captured image outputted from the image capturing section 210 (step S921), and also a person's face included in this captured image is detected (step S922). Then, on the basis of the extracted feature values, it is determined whether or not a subject included in the captured image outputted from the image capturing section 210 corresponds to a night view scene (step S923). If the subject included in the captured image corresponds to a night view scene (step S923), image capture modes suitable for capturing a night view scene are selected as image capture mode candidates. For example, the image capture modes included in the group B (312) shown in FIG. 5 are selected as image capture mode candidates.

On the other hand, if the subject included in the captured image does not correspond to a night view scene (step S923), image capture modes suitable for scenes other than a night view scene are selected as image capture mode candidates (step S925). For example, the image capture modes included in the group C (313) shown in FIG. 5 are selected as image capture mode candidates.

Then, it is determined whether or not the face detected from the captured image is a main subject in this captured image (step S926). If the face detected from the captured image is a main subject in this captured image (step S926), image capture modes suitable for cases where a face is a main subject are selected as image capture mode candidates (step S927). For example, the image capture modes included in the group D (314) shown in FIG. 5 are selected as image capture mode candidates. On the other hand, if the face detected from the captured image is not a main subject in this captured image (step S926), the image capture modes selected in step S925 are retained (step S928), and the process proceeds to step S940.

Then, it is determined whether or not the face detected from the captured image is still, and the size and position of the face in the captured image fall within a specified range (step S929). If the face detected from the captured image is still, and the size and position of the face in the captured image fall within a specified range (step S929), image capture modes suitable for capturing a face that is still are selected as image capture mode candidates (step S930). For example, the Portrait mode (group E (315)) shown in FIG. 5 is selected as an image capture mode candidate. On the other hand, if a face has not been detected from the captured image, if the face detected from the captured image is not still, or if the size and position of that face in the captured image do not fall within a specified range (step S929), it is determined whether or not there is a motion in the face detected from the captured image (step S931). If there is a motion in the face detected from the captured image (step S931), image capture modes suitable for capturing a moving face are selected as image capture mode candidates (step S932). For example, the High-speed Shutter mode and the Subject Tracking mode (group F (316)) shown in FIG. 5 are selected as image capture mode candidates.

On the other hand, if a face has not been detected from the captured image, or if there is no motion in the face detected from the captured image (step S931), a specific image capture mode determination process is executed (step S940). It should be noted that the specific image capture mode determination process will be described later in detail with reference to FIG. 13. Then, the selected image capture mode candidates are verified as image capture mode candidates (step S933).

Figure 13:
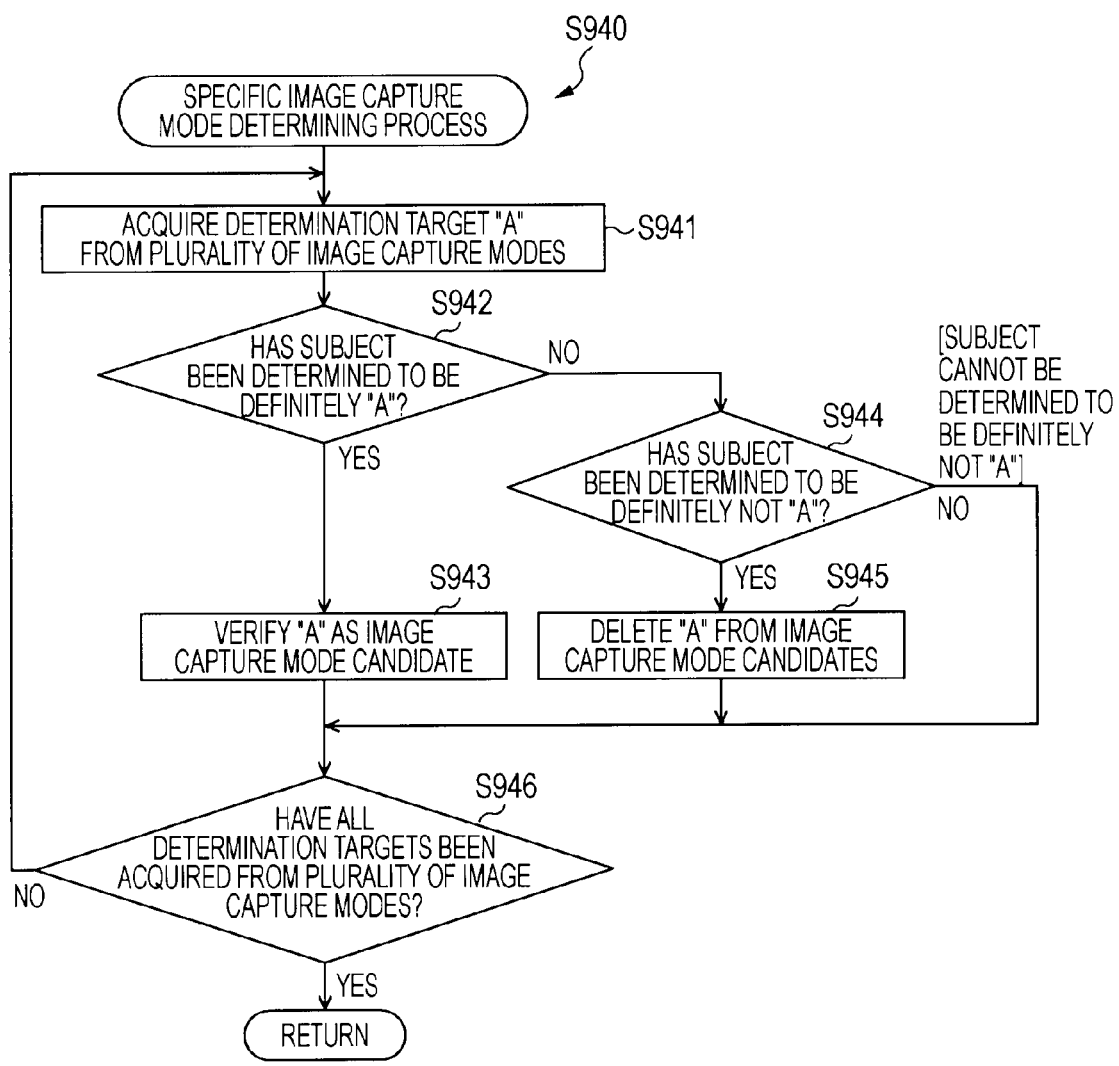
FIG. 13 is a flowchart showing a specific image capture mode determining procedure performed by an image capturing apparatus.

FIG. 13 is a flowchart showing a specific image capture mode determination procedure (the procedure of step S940 shown in FIG. 12) of the procedure of the image capture mode candidate selection process performed by the image capturing apparatus 100.

First, one image capture mode is selected as a determination target from among image capture modes stored in the image capture mode storing section 250, and this selected image capture mode is set as a determination target image capture mode A (step S941). For example, the Underwater mode is selected as a determination target from the group A (311) shown in FIG. 5.

Then, it is determined whether or not a subject in a captured image definitely corresponds to the determination target image capture mode A (step S942). If it is definitely determined that a subject in a captured image corresponds to the determination target image capture mode A (step S942), the determination target image capture mode A is verified as an image capture mode candidate (step S943), and the process proceeds to step S946.

On the other hand, if it is not definitely determined that a subject in a captured image corresponds to the determination target image capture mode A (step S942), it is determined whether or not the subject in the captured image does not definitely correspond to the determination target image capture mode A (step S944). If it is definitely determined that the subject in the captured image does not correspond to the determination target image capture mode A (step S944), the determination target image capture mode A is deleted from the already selected image capture mode candidates (step S945), and the process proceeds to step S946.

On the other hand, if it is not definitely determined that the subject in the captured image does not correspond to the determination target image capture mode A (step S944), it is determined whether or not all of the image capture modes stored in the image capture mode storing section 250 have been selected as determination targets (step S946). If all of the image capture modes have been selected as determination targets (step S946), the specific image capture mode determination process is terminated. On the other hand, if not all of the image capture modes have been selected as determination targets (step S946), the process returns to step S941, and the specific image capture mode determination process is repeated (steps S941 to S945). It should be noted that while in the above-mentioned example all of the image capture modes stored in the image capture mode storing section 250 are set as determination targets, only predetermined image capture modes may be set as determination targets.

Figure 14:
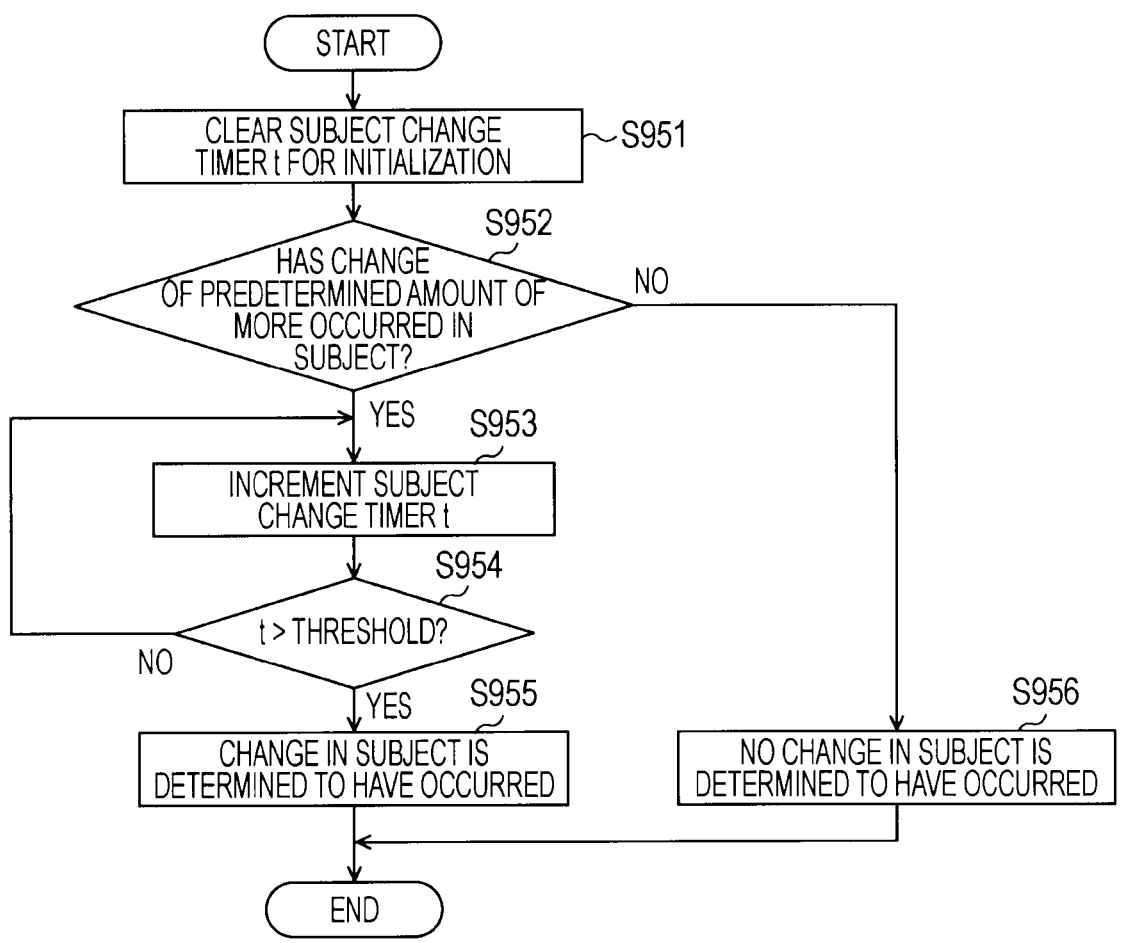
FIG. 14 is a flowchart showing the procedure of a subject change determination process performed by an image capturing apparatus.

FIG. 14 is a flowchart showing the procedure of a subject change determination process performed by the image capturing apparatus 100.

First, a subject change timer t is cleared and initialized (step S951). Then, it is determined whether or not a change of a predetermined amount or more has occurred in a subject in a captured image (step S952). For example, it is determined whether or not the amount of change in the brightness and hue of a captured image is a predetermined value or more. If the amount of change is a predetermined value or more, it is determined that the change in the subject is a predetermined value or more. If a change of a predetermined amount or more has not occurred in the subject in the captured image (step S952), it is determined that no change has occurred in the subject (step S956).

On the other hand, if a change of a predetermined amount or more has occurred in a subject in a captured image (step S952), the subject change timer t is incremented (step S953), and it is determined whether or not the subject change timer t indicates a value that is larger than a threshold T (step S954). If the value of the subject change timer t is not larger than the threshold T (step S954), the subject change timer t is incremented (step S953), and the elapse of a predetermined period of time is monitored (steps S953 and S954).

If the subject change timer t has become larger than the threshold T (step S954), it is determined that a change has occurred in the subject (step S955).

It should be noted that the determination as to whether or not a change of a predetermined amount or more has occurred in a subject in a captured image may be made by using the amount of change in brightness and hue in two successively captured images, or may be determined by using the amount of change in brightness and hue in two images that are captured at a predetermined interval.

Figure 15A:
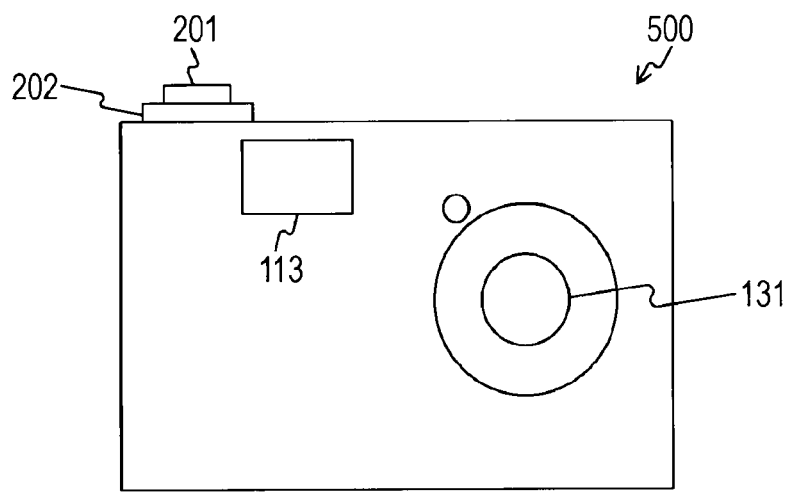
FIGS. 15A to 15C are views each showing the outward appearance of an image capturing apparatus 500 obtained by modifying a part of the image capturing apparatus 100.
Figure 15B:
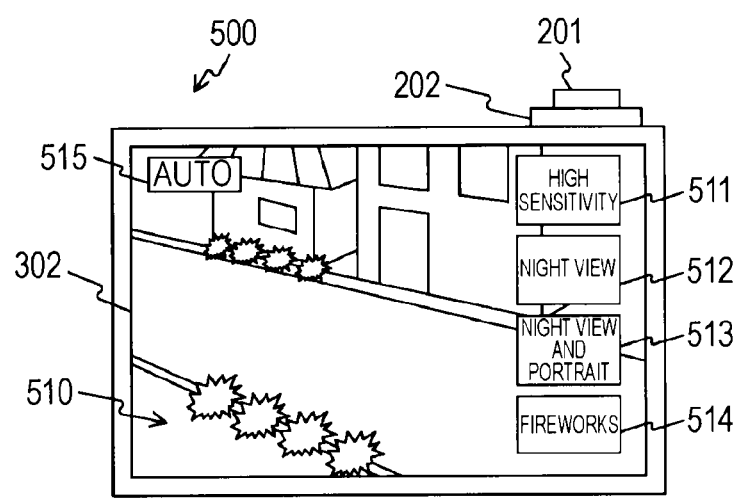
Figure 15C:
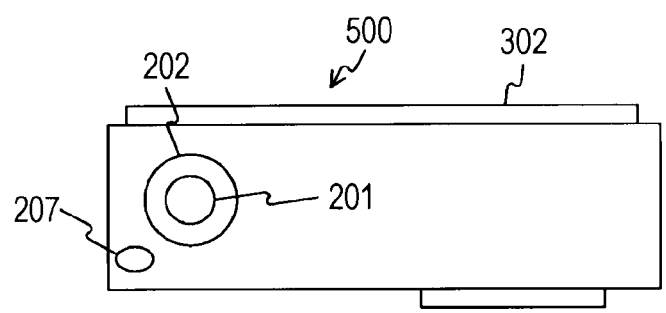

FIGS. 15A to 15C are views each showing the outward appearance of an image capturing apparatus 500 obtained by modifying a part of the image capturing apparatus 100 shown in FIGS. 2A to 2C. FIG. 15A is a front view showing the outward appearance of the image capturing apparatus 500, FIG. 15B is a rear view showing the outward appearance of the image capturing apparatus 500, and FIG. 15C is a plan view showing the outward appearance of the image capturing apparatus 500. The image capturing apparatus 500 is an image capturing apparatus that is provided with a liquid crystal display section 302, instead of the zoom button 203, the up/down/left/right operating button 204, the Enter button 205, the operating button 206, and the liquid crystal display section 301 that are provided in the image capturing apparatus 100 shown in FIGS. 2A to 2C. Since the configuration of the image capturing apparatus 500 other than these components is the same as that of the image capturing apparatus 100 shown in FIGS. 2A to 2C, description of the configuration other than these components is omitted.

The liquid crystal display section 302 is a liquid crystal display section implemented by a touch panel. A captured image 510, image capture mode setting buttons 511 to 514, and a current image capture mode display area 515 are displayed in the liquid crystal display section 302. Also, various setting buttons such as a zoom button and the like are displayed on the liquid crystal display section 302. To set a desired image capture mode by using the image capture mode setting buttons 511 to 514, the user depresses an image capture mode setting button corresponding to the desired image capture mode. By using a touch panel in this way, an area touched with a finger or the like can be selected. This allows for an intuitive operation, thus facilitating the selecting operation of an image capture mode setting button. Further, the number of input operation steps required for making a selection can be significantly reduced. It should be noted that the image capture mode setting buttons and the current image capture mode display area described above are the same as those shown in FIGS. 7A to 10B, so description thereof is omitted here.

It should be noted that in the embodiment of the present invention, image capture mode setting buttons may be always displayed on the liquid crystal display section, or may be displayed only when an operation for instructing the image capture mode setting buttons to be displayed is made by the user. A software switch or a hardware switch allowing the user to make this instructing operation may be provided to the image capturing apparatus. Further, the image capturing apparatus may be provided with selecting means for selecting between the function of always turning the display ON or OFF or the function of turning the display ON only when determined necessary by the image capturing apparatus. Further, with regard to image capture modes for which it is considered better to change camera settings in accordance with user preferences, the image capturing apparatus may display image capture mode candidates as required.

In the embodiment of the present invention, if it is determined that a change has occurred in a subject, an initial button including letters is displayed after a reduced image included in an image capture mode setting button is erased. However, a configuration may be adopted in which instead of using this initial button, an effect confirmation image is always created from a captured image, this effect confirmation image is displayed so as to be included in an image capture mode setting button, and the effect confirmation image is updated as the need arises.

In the embodiment of the present invention, the image capture mode candidate selection process is carried out even in a state with the release switch 201 pressed halfway down (during locking). This is because there are cases where, for example, a new subject is recognized or detected as the subject is brought into focus after the release switch 201 is pressed halfway down. Then, by the recognition or detection of this new subject, new image capture mode candidates can be selected. Further, even in a case where the image capture mode being currently set is such that shooting is automatically started during locking, the image capture mode candidate selection process is carried out in a similar manner. This is to allow some leeway for the user to change the image capture mode before shooting is started. It should be noted that there are cases where when a specific image capture mode is selected, shooting is started before the release is pressed deeply. Such a specific image capture mode is, for example, an image capture mode suitable for shooting smiling faces, whereby shooting is automatically started upon detecting a smiling face.

While the embodiment of the present invention is directed to a case where a face is detected as a target object serving as a subject, the embodiment of the present invention is also applicable to a case of detecting or recognizing another kind of target object or scene. For example, the embodiment of the present invention is applicable to the detection or recognition of various kinds of subject, such as the constituent parts of a face such as the eyes, the nose, or the mouth, a car, a wood, a house, a scenery, an animal, or a food.

As described above, according to the embodiment of the present invention, the image capturing apparatus can automatically narrow down image capture modes to present to the user only an image capture mode assumed to be suitable for a subject that is about to be shot. Thus, the optimal shooting condition adapted to the user preferences can be quickly and easily set with reliability, thereby making it possible to reduce shooting failures. Further, since one or a plurality of image capture modes suitable for the current subject can be repeatedly selected with ease, shooting failures can be further reduced through the user's active utilization. Further, a fusion with image recognition processing makes it possible to reduce the trouble associated with the setting of a shooting scene by the user, thereby providing enhanced quick shooting capability. Further, effective use of the camera's advanced image recognition techniques allows anyone to record an optimal captured image with ease.

It should be understood that the embodiment of the present invention is merely an example of carrying out the present invention, and has correspondence to the invention-specifying matters in the claims as will be described below. However, the present invention is not limited to the embodiment, and various modifications can be made to the present invention without departing from the scope of the present invention.

It should be noted that the procedures described in the embodiment of the present invention may each be grasped as a method including the series of these steps, or may be grasped as a program for causing a computer to execute the series of these steps or a recording medium on which the program is stored.

What is claimed is:

1. A data processing apparatus comprising:
   image capture mode storing means for storing image capture modes each associated with a feature value related to a subject as a selection condition for selecting an image capture mode candidate according to the subject;
   feature value extracting means for extracting a feature value included in captured data that is captured by converting incident light from the subject;
   image capture mode candidate selecting means for selecting image capture mode candidates from among the image capture modes stored in the image capture mode storing means, on the basis of the feature value extracted from the feature value extracting means;
   display control means for displaying on display means the image capture mode candidates selected by the image capture mode candidate selecting means;
   operation accepting means for accepting a selecting operation for selecting a desired image capture mode from among the image capture mode candidates displayed on the display means;
   image capture mode setting means for setting the image capture mode selected by the selecting operation; and
   reduced image generating means for generating a reduced image by reducing, when the selecting operation for selecting a desired image capture mode is accepted by the operation accepting means, a captured image wherein the display control means displays the reduced image together with an indicator indicating an image capture mode that is set at the time when the selecting operation is accepted.

2. The data processing apparatus according to claim 1, wherein:
   the display control means displays indicators on the display means, the indicators indicating the image capture mode candidates selected by the image capture mode candidate selecting means and each including at least one of a letter, a symbol, a numeral, and a figure related to each of the selected image capture mode candidates.

3. The data processing apparatus according to claim 1, wherein:
   the operation accepting means accepts a selecting operation for selecting a desired image capture mode from among the image capture mode candidates displayed on the display means.

4. The data processing apparatus according to claim 1, further comprising:
   subject change determining means for determining a certain change that has occurred in a subject included in the captured image, on the basis of the feature value extracted from the feature value extracting means,
   wherein the display control means erases the displayed reduced image if it is determined that a certain change has occurred in a subject included in the captured image.

5. The data processing apparatus according to claim 4, wherein:
   if it is determined that a certain change has occurred in a subject included in the captured image, the display control means displays a message stating that the displayed reduced image is to be erased, before erasing the displayed reduced image.

6. The data processing apparatus according to claim 1, wherein:
   the image capture mode candidate selecting means selects image capture mode candidates from among the image capture modes stored in the image capture mode storing means, by determining whether or not the subject definitely corresponds to a specific image capture mode of the image capture modes stored in the image capture mode storing means and whether or not the subject does not definitely correspond to the specific image capture mode, on the basis of the extracted feature value.

7. The data processing apparatus according to claim 1, wherein:
   the image capture mode storing means stores image capture modes each associated with information related to a predetermined target object as the selection condition;
   the data processing apparatus further comprises target object detecting means for detecting the predetermined target object included in the captured data; and
   the image capture mode candidate selecting means selects image capture mode candidates from among the image capture modes stored in the image capture mode storing means, on the basis of the feature value extracted from the feature value extracting means and the target object detected by the target object detecting means.

8. The data processing apparatus according to claim 7, wherein:
   the target object detecting means detects a face of a person as the predetermined target object included in the captured data; and
   the image capture mode candidate selecting means selects image capture mode candidates from among the image capture modes stored in the image capture mode storing means, on the basis of a relative relationship between a captured image corresponding to the captured data and the detected face.

9. The data processing apparatus according to claim 1, further comprising:
   image capturing means for performing image capture by converting incident light from a subject into captured data.

10. A data processing method comprising the steps of:
    storing image capture modes each associated with a feature value related to a subject as a selection condition for selecting an image capture mode candidate according to the subject;
    extracting a feature value included in captured data that is captured by converting incident light from the subject;
    selecting image capture mode candidates from the stored image capture modes on the basis of the extracted feature value;
    displaying the selected image capture mode candidates on display means;
    accepting a selecting operation for selecting a desired image capture mode from among the image capture mode candidates displayed on the display means;
    setting the image capture mode selected by the selecting operation; and
    generating a reduced image by reducing, when the selecting operation for selecting a desired image capture mode is accepted, a captured image wherein the reduced image is displayed together with an indicator indicating an image capture mode that is set at the time when the selecting operation is accepted.

11. A data processing apparatus comprising:

image capture mode storing means for storing image capture modes each associated with a feature value related to a subject as a selection condition for selecting an image capture mode candidate according to the subject;

target object detecting means for detecting a target object included in captured data that is captured by converting incident light from the subject;

image capture mode candidate selecting means for selecting image capture mode candidates from among the image capture modes stored in the image capture mode storing means, on the basis of the target object detected from the target object detecting means; and display control means for displaying on display means the image capture mode candidates selected by the image capture mode candidate selecting means;

operation accepting means for accepting a selecting operation for selecting a desired image capture mode from among the image capture mode candidates displayed on the display means;

image capture mode setting means for setting the image capture mode selected by the selecting operation; and reduced image generating means for generating a reduced image by reducing, when the selecting operation for selecting a desired image capture mode is accepted by the operation accepting means, a captured image wherein the display control means displays the reduced image together with an indicator indicating an image capture mode that is set at the time when the selecting operation is accepted.

12. A data processing method comprising the steps of:

storing image capture modes each associated with a feature value related to a subject as a selection condition for selecting an image capture mode candidate according to the subject;

detecting a target object included in captured data that is captured by converting incident light from the subject;

selecting image capture mode candidates from among the stored image capture modes on the basis of the detected target object;

displaying the selected image capture mode candidates on display means;

accepting a selecting operation for selecting a desired image capture mode from among the image capture mode candidates displayed on the display means;

setting the image capture mode selected by the selecting operation; and generating a reduced image by reducing, when the selecting operation for selecting a desired image capture mode is accepted, a captured image wherein the reduced image is displayed together with an indicator indicating an image capture mode that is set at the time when the selecting operation is accepted.

13. A data processing apparatus comprising:

an image capture mode storing section that stores image capture modes each associated with a feature value related to a subject as a selection condition for selecting an image capture mode candidate according to the subject;

a feature value extracting section that extracts a feature value included in captured data that is captured by converting incident light from the subject;

an image capture mode candidate selecting section that selects image capture mode candidates from among the image capture modes stored in the image capture mode storing section, on the basis of the feature value extracted from the feature value extracting section; and a display control section that displays on a display section the image capture mode candidates selected by the image capture mode candidate selecting section; and an operation accepting section that accepts a selecting operation for selecting a desired image capture mode from among the image capture mode candidates displayed on the display section;

an image capture mode setting section that sets the image capture mode selected by the selecting operation; and a reduced image generating section that generates a reduced image by reducing, when the selecting operation for selecting a desired image capture mode is accepted by the operation accepting section, a captured image wherein the display control section displays the reduced image together with an indicator indicating an image capture mode that is set at the time when the selecting operation is accepted.

14. A data processing apparatus comprising:

an image capture mode storing section that stores image capture modes each associated with a feature value related to a subject as a selection condition for selecting an image capture mode candidate according to the subject;

a target object detecting section that detects a target object included in captured data that is captured by converting incident light from the subject;

an image capture mode candidate selecting section that selects image capture mode candidates from among the image capture modes stored in the image capture mode storing section, on the basis of the target object detected from the target object detecting section; and a display control section that displays on a display section the image capture mode candidates selected by the image capture mode candidate selecting section; and an operation accepting section that accepts a selecting operation for selecting a desired image capture mode from among the image capture mode candidates displayed on the display section;

an image capture mode setting section that sets the image capture mode selected by the selecting operation; and a reduced image generating section that generates a reduced image by reducing, when the selecting operation for selecting a desired image capture mode is accepted by the operation accepting section, a captured image wherein the display control section displays the reduced image together with an indicator indicating an image capture mode that is set at the time when the selecting operation is accepted.

* * * * *